US012681823B1

(12) United States Patent
Chen et al.

(10) Patent No.: US 12,681,823 B1
(45) Date of Patent: Jul. 14, 2026

(54) TECHNIQUES FOR ANALYZING STREAMING DATA

(71) Applicant: SAS Institute Inc., Cary, NC (US)

(72) Inventors: Xilong Chen, Chapel Hill, NC (US); Sylvie Tchumtchoua Kabisa, Morrisville, NC (US); Dillon Frame, Chapel Hill, NC (US); Ming-Chun Chang, Cary, NC (US); Wanxi Gu, Beijing (CN); Gunce Eryuruk Walton, Raleigh, NC (US); David Bruce Elsheimer, Clayton, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 19/020,125

(22) Filed: Jan. 14, 2025

Related U.S. Application Data

(63) Continuation-in-part of application No. 18/761,865, filed on Jul. 2, 2024.

(51) Int. Cl.
| | |
|---|---|
| *G06F 11/34* | (2006.01) |
| *G06F 9/54* | (2006.01) |
| *G06F 11/30* | (2006.01) |

(52) U.S. Cl.
CPC .......... G06F 11/3006 (2013.01); G06F 9/546 (2013.01); G06F 11/3447 (2013.01); *G06F 2201/80* (2013.01)

(58) Field of Classification Search
CPC ............. G06F 11/3006; G06F 11/2023; G06F 11/2041; G06F 11/0709; G06F 17/16; G06F 11/3447; G06N 20/00
See application file for complete search history.

(56) References Cited

U.S. PATENT DOCUMENTS

| | | | |
|---|---|---|---|
| 7,475,048 B2 | 1/2009 | Weston | |
| 11,443,198 B1 * | 9/2022 | Chen | G06F 17/16 |
| 12,056,207 B1 | 8/2024 | Chen et al. | |
| 2015/0134626 A1 * | 5/2015 | Theimer | G06F 11/3055 |
| | | | 707/693 |
| 2016/0004610 A1 * | 1/2016 | Knight | G06F 11/2028 |
| | | | 714/4.11 |
| 2018/0011882 A1 * | 1/2018 | Taylor | G06F 16/22 |

(Continued)

OTHER PUBLICATIONS

Ruiz, Gabriel, Oscar Hernan Madrid Padilla, and Qing Zhou. "Sequentially learning the topological ordering of causal directed acyclic graphs with likelihood ratio scores." arXiv preprint arXiv:2202. 01748 (2022). (Year: 2022).*

(Continued)

*Primary Examiner* — Yolanda L Wilson
(74) *Attorney, Agent, or Firm* — Padowithz Alce; Quintin Scheitlin; Alce PLLC

(57) ABSTRACT

A system and method include receiving a request to analyze streaming data on a grid computing environment, sending, by a primary control node, a portion of the streaming data to each of the plurality of worker nodes, such that each of the plurality of worker nodes analyzes the portion of the streaming data received from the primary control node, receiving, by the primary control node, sub-results from each of the plurality of worker nodes, combining, by the primary control node, the sub-results to compute a result, and outputting, by the primary control node, the result analyzing the streaming data.

20 Claims, 21 Drawing Sheets

(56)                     References Cited

U.S. PATENT DOCUMENTS

| | | |
|---|---|---|
| 2018/0137155 A1 | 5/2018 | Majumdar |
| 2018/0241764 A1* | 8/2018 | Nadolski ................. H04L 63/20 |
| 2019/0042911 A1 | 2/2019 | Koren |
| 2020/0387747 A1* | 12/2020 | Cha ........................ G06F 18/214 |
| 2021/0224051 A1* | 7/2021 | Bequet ................ G06F 9/45533 |
| 2021/0342490 A1* | 11/2021 | Briancon ................ G06F 21/14 |
| 2022/0108334 A1 | 4/2022 | Chauhan |
| 2022/0138502 A1 | 5/2022 | Li |
| 2023/0138016 A1 | 5/2023 | Kaiser |
| 2025/0045263 A1 | 2/2025 | Chen et al. |
| 2025/0045355 A1 | 2/2025 | Chen et al. |
| 2025/0045611 A1 | 2/2025 | Chen et al. |
| 2025/0053615 A1 | 2/2025 | Chen et al. |

OTHER PUBLICATIONS

Non-Final Office Action in U.S. Appl. No. 18/751,584 dated Apr. 24, 2025, 59 pages.

Final Office Action in U.S. Appl. No. 18/905,480 dated Apr. 30, 2025, 66 pages.

Final Office Action in U.S. Appl. No. 18/802,737 dated Mar. 18, 2025, 18 pages.

Goodnight, James H., "A Tutorial on the SWEEP Operator," The American Statistician, Aug. 1979, pp. 149-158, vol. 33, No. 3.

Wang, et al., "Efficient test for nonlinear dependence of two continuous variables," BMC Bioinformatics, 2015, 8 pages, vol. 16, No. 260.

Non-Final Office Action in U.S. Appl. No. 18/751,509 dated Sep. 29, 2024, 14 pages.

Non-Final Office Action in U.S. Appl. No. 18/751,584 dated Sep. 29, 2024, 15 pages.

Rolland, et al., "Score matching enables causal discovery of nonlinear additive noise models," In International Conference on Machine Learning, PMLR, 2022, pp. 18741-18753.

Montagna, et al., "Scalable causal discovery with score matching," 2nd Conference on Causal Learning and Reasoning, 2023, pp. 752-771, vol. 213: 1-20.

"Anderson-Darling Test," Wikipedia, The Free Encyclopedia, 6 pages, retrieved Feb. 24, 2024, https://en.wikipedia.org/wiki/Anderson%E2%80%93Darling_test.

Li, Adam, dodiscover.toporder.SCORE, 2024, 3 pages, https://www.pywhy.org/dodiscover/dev/generated/dodiscover.toporder.SCORE.html.

Non-Final Office Action in U.S. Appl. No. 18/761,865 dated Oct. 11, 2024, 17 pages.

Non-Final Office Action in U.S. Appl. No. 18/905,480 dated Nov. 29, 2024, 16 pages.

Final Office Action in U.S. Appl. No. 18/761,865 dated Dec. 30, 2024, 13 pages.

Final Office Action in U.S. Appl. No. 18/751,509 dated Dec. 31, 2024, 18 pages.

Final Office Action in U.S. Appl. No. 18/751,584 dated Dec. 31, 2024, 15 pages.

Non-Final Office Action in U.S. Appl. No. 18/947,502 dated Feb. 13, 2025, 15 pages.

Non-Final Office Action in U.S. Appl. No. 18/802,737 dated Dec. 2, 2024, 15 pages.

Chen, et al., "Directed Acyclic Graphs With Tears," IEEE Transactions on Artificial Intelligence, Aug. 2023, pp. 972—vol. 4, No., 4.

Fang, et al., "On Low-Rank Dircted Acyclic Graphs and Causal Structure Learning," IEEE Transations on Neural Networks and Learning Systems, Apr. 2024, pp. 4924-4937, vol. 35, No. 4.

Wang, et al., "Learning directed acyclic graphs via bootstrap aggregating," Jun. 9, 2014, 47 pages.

"Erdös-Rényi model," Wikipedia, The Free Encyclopedia, 7 pages, retrieved Mar. 26, 2024, https://en.wikipedia.org/w/index.php?title=Erd%C5%91s%E2%80%93R%C3%A9nyi_model&oldid=1215607832.

"Scale-free network." Wikipedia, The Free Encyclopedia. Wikipedia, The Free Encyclopedia, 16 pages, retrieved Mar. 26, 2024. https://en.wikipedia.org/w/index.php?title=Scale-free_network&oldid=1215607982.

Non-Final Office Action in U.S. Appl. No. 18/538,066 dated Mar. 27, 2024, 34 pages.

Ruiz, et al., "Sequentially learning the topological ordering of causal directed acyclic graphs with likelihood ratio scores," May 19, 2022, 22 pages.

Gagrani, et al., "Neural Topological Ordering for Computation Graphs," Oct. 7, 2022, 18 pages.

Final Office Action in U.S. Appl. No. 18/538,066 dated Jul. 18, 2024, 29 pages.

Non-Final Office Action in U.S. Appl. No. 18/538,070 dated Feb. 12, 2024, 18 pages.

Notice of Allowance in U.S. Appl. No. 19/175,902 dated Jun. 25, 2025, 10 pages.

Non-Final Office Action in U.S. Appl. No. 18/7661,865 dated Sep. 11, 2025, 13 pages.

* cited by examiner

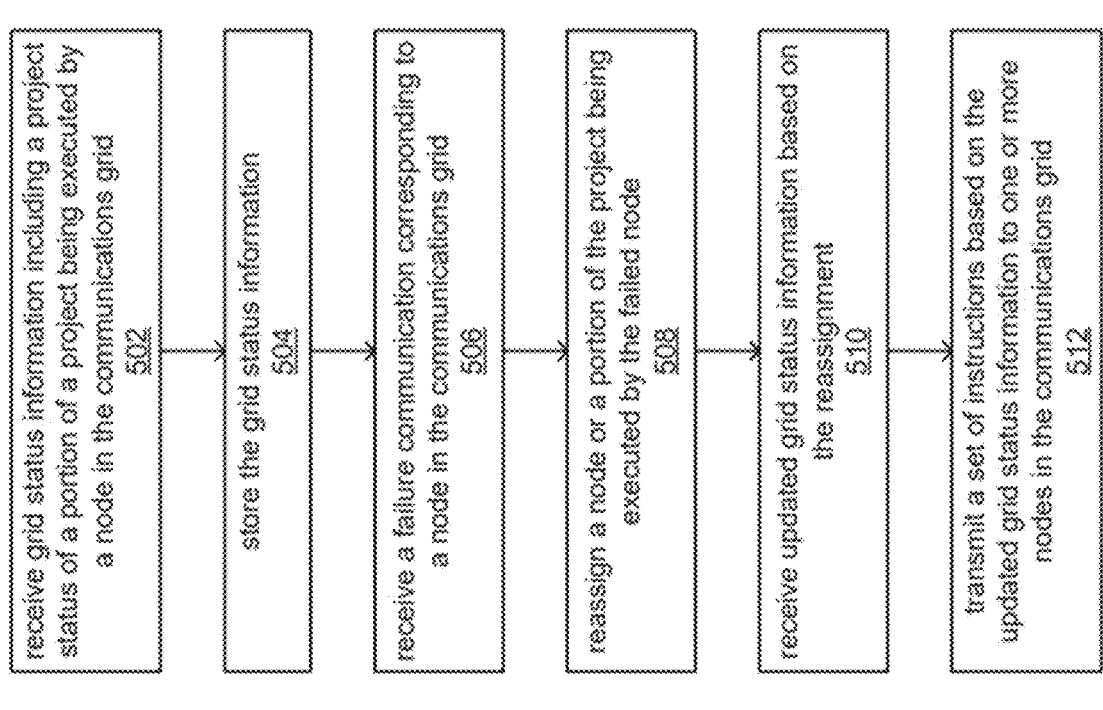

receive grid status information including a project status of a portion of a project being executed by a node in the communications grid
502 store the grid status information
504 receive a failure communication corresponding to a node in the communications grid
506 reassign a node or a portion of the project being executed by the failed node
508 receive updated grid status information based on the reassignment
510 transmit a set of instructions based on the updated grid status information to one or more nodes in the communications grid
512

~700 receive request for executing a project
702 receive request for grid computing environment to execute project?
704 initiate and execute project in gridded environment & perform data analysis
706 transmit results of analysis
708 initiate and execute project in solo environment
710 provide results of project
712

1300

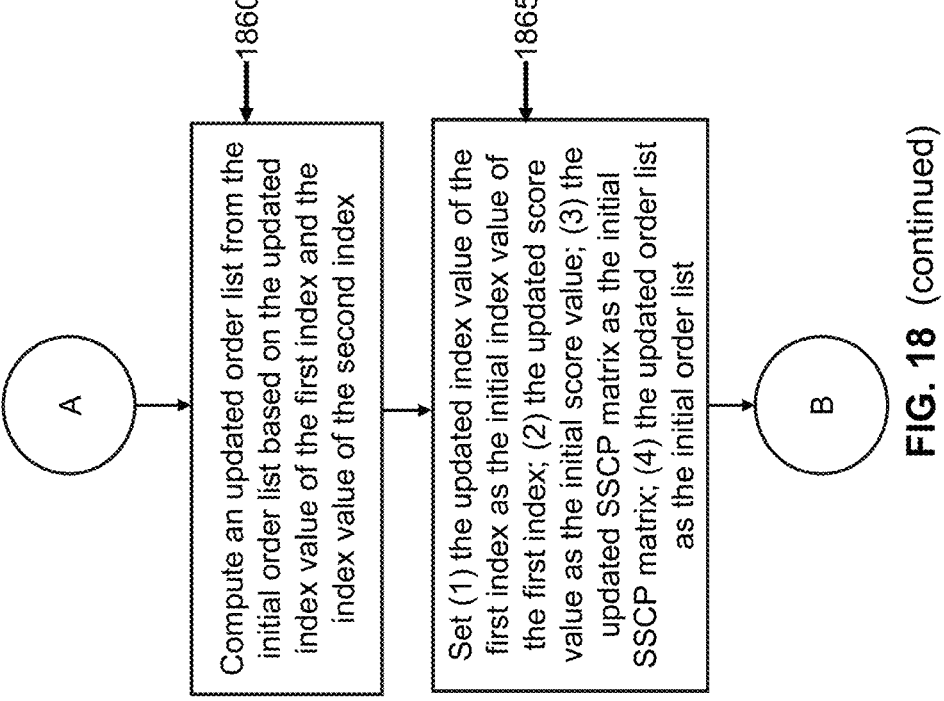

1860

Compute an updated order list from the initial order list based on the updated index value of the first index and the index value of the second index

1865

Set (1) the updated index value of the first index as the initial index value of the first index; (2) the updated score value as the initial score value; (3) the updated SSCP matrix as the initial SSCP matrix; (4) the updated order list as the initial order list

TECHNIQUES FOR ANALYZING STREAMING DATA

BRIEF DESCRIPTION OF THE DRAWINGS

FIG. 5 illustrates a flow chart showing an example process for adjusting a communications grid or a work project in a communications grid after a failure of a node, according to some embodiments of the present technology.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skills in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
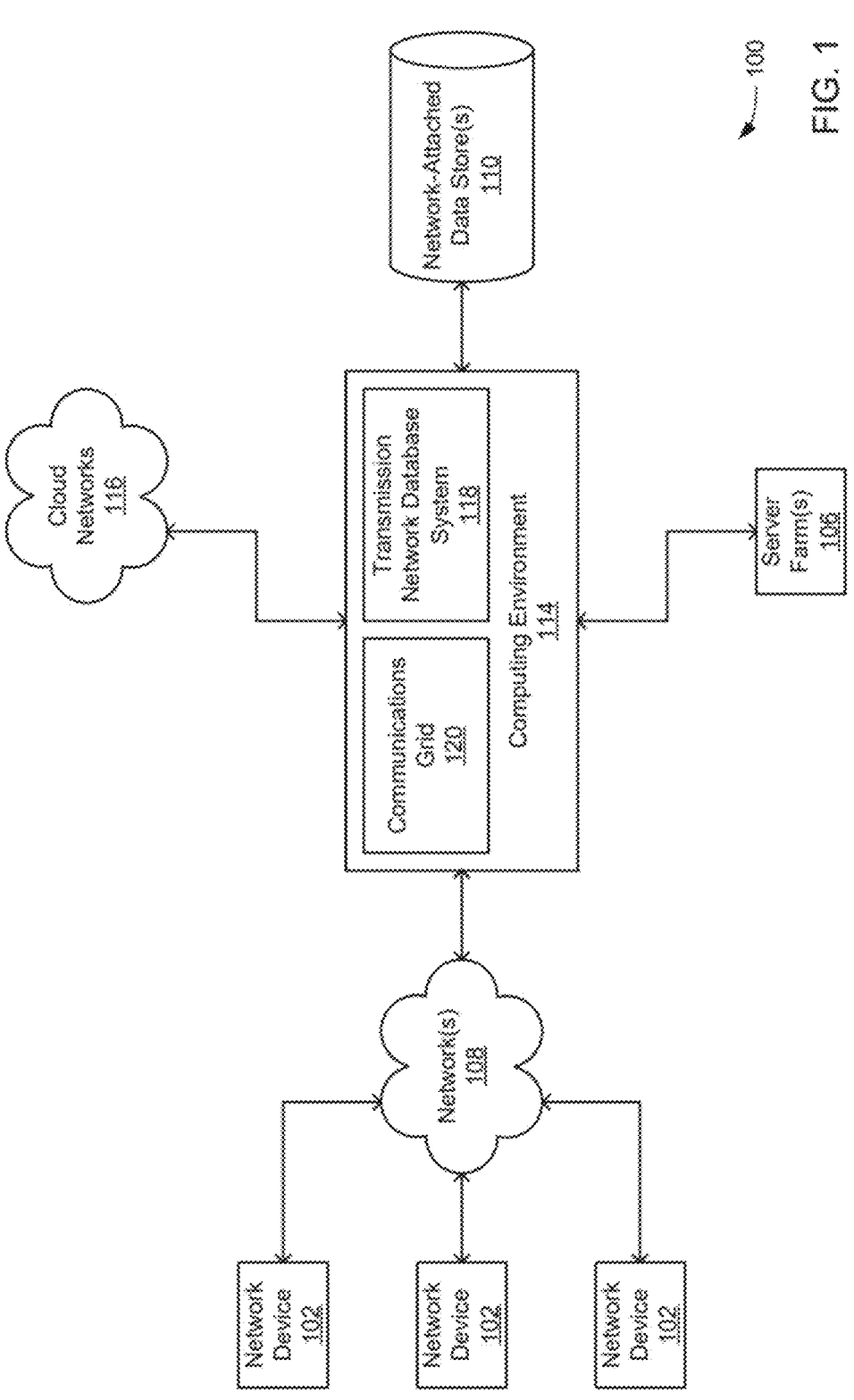
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
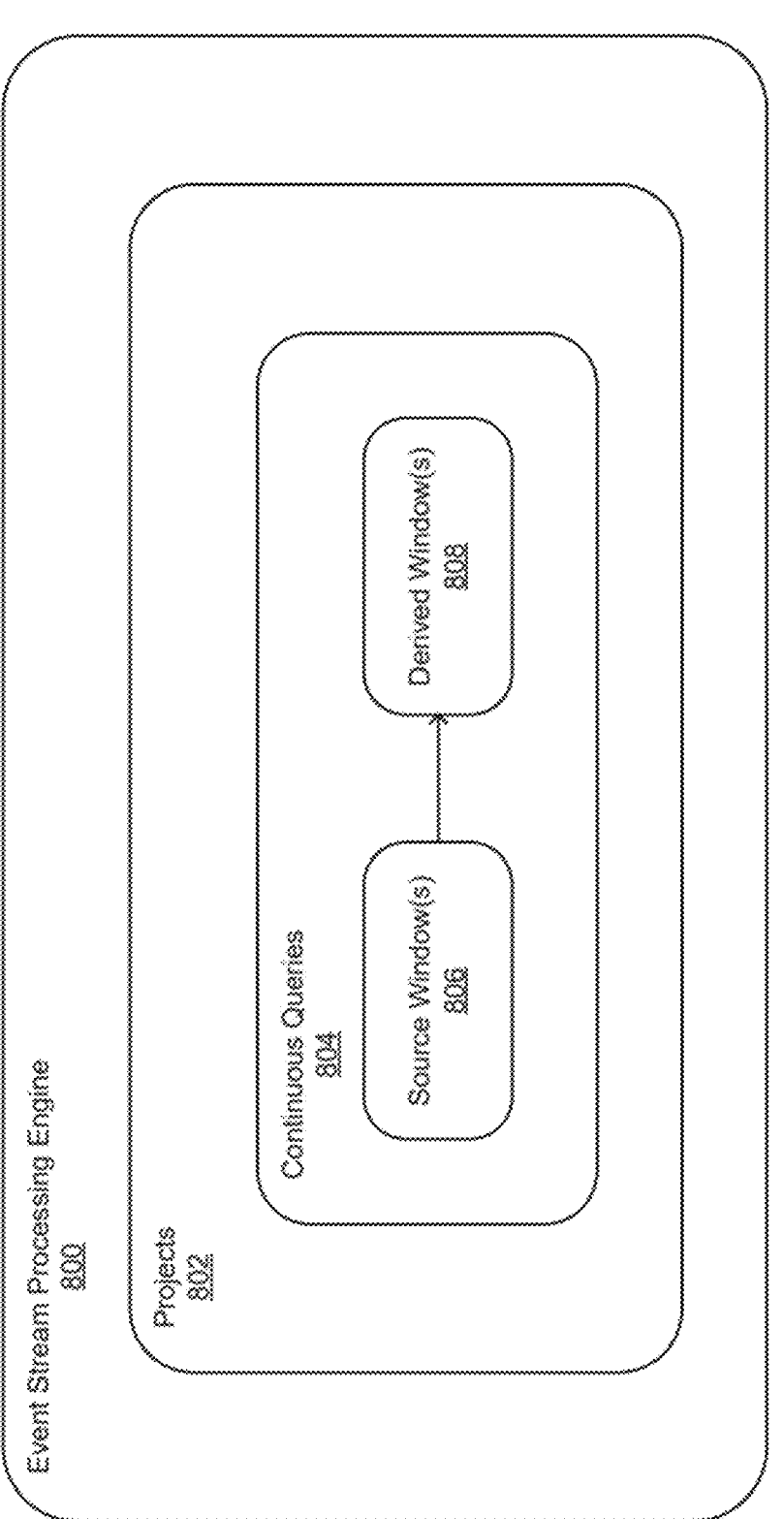
FIG. 8 illustrates a block diagram including components of an Event Stream Processing Engine (ESPE), according to embodiments of the present technology.
Figure 9:
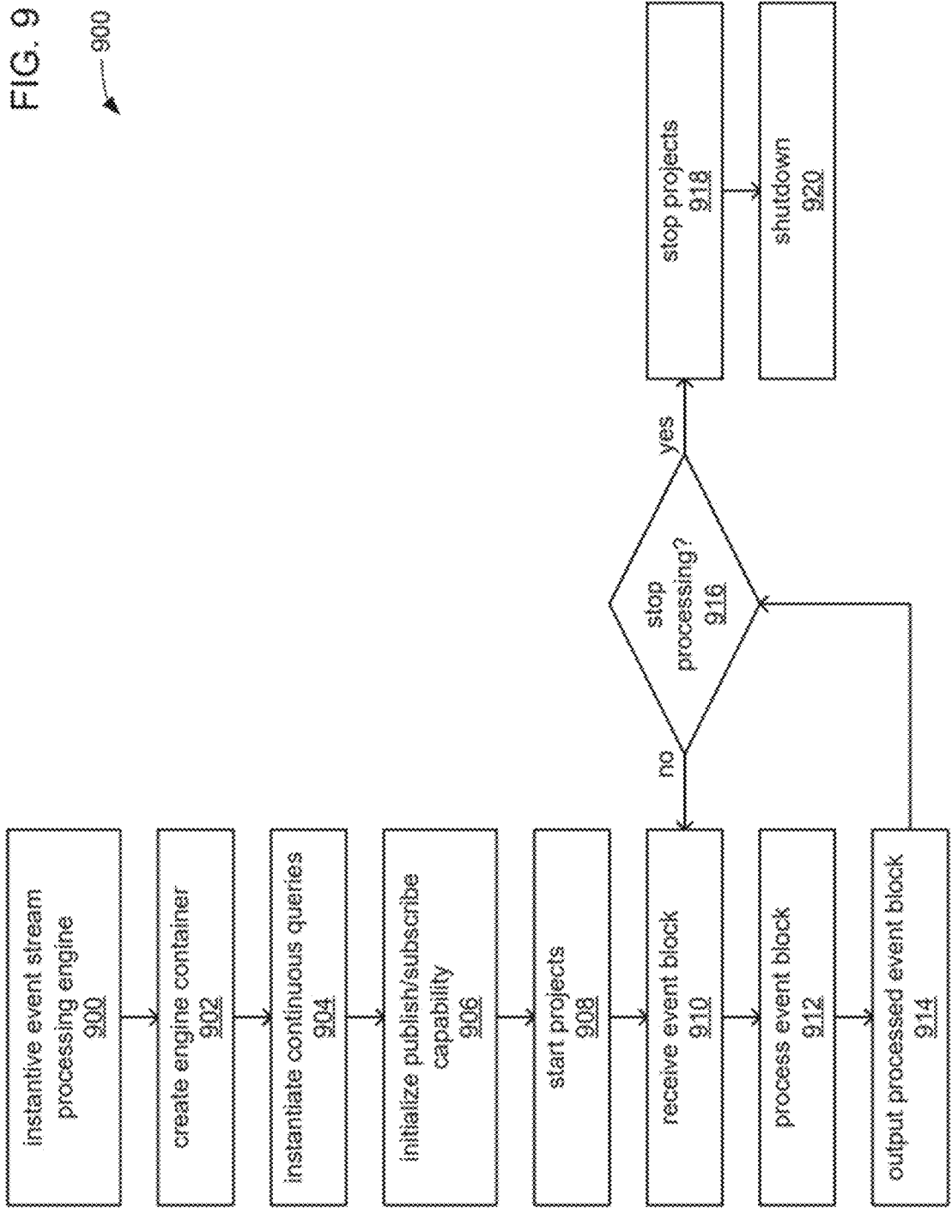
FIG. 9 illustrates a flow chart showing an example process including operations performed by an event stream processing engine, according to some embodiments of the present technology.
Figure 10:
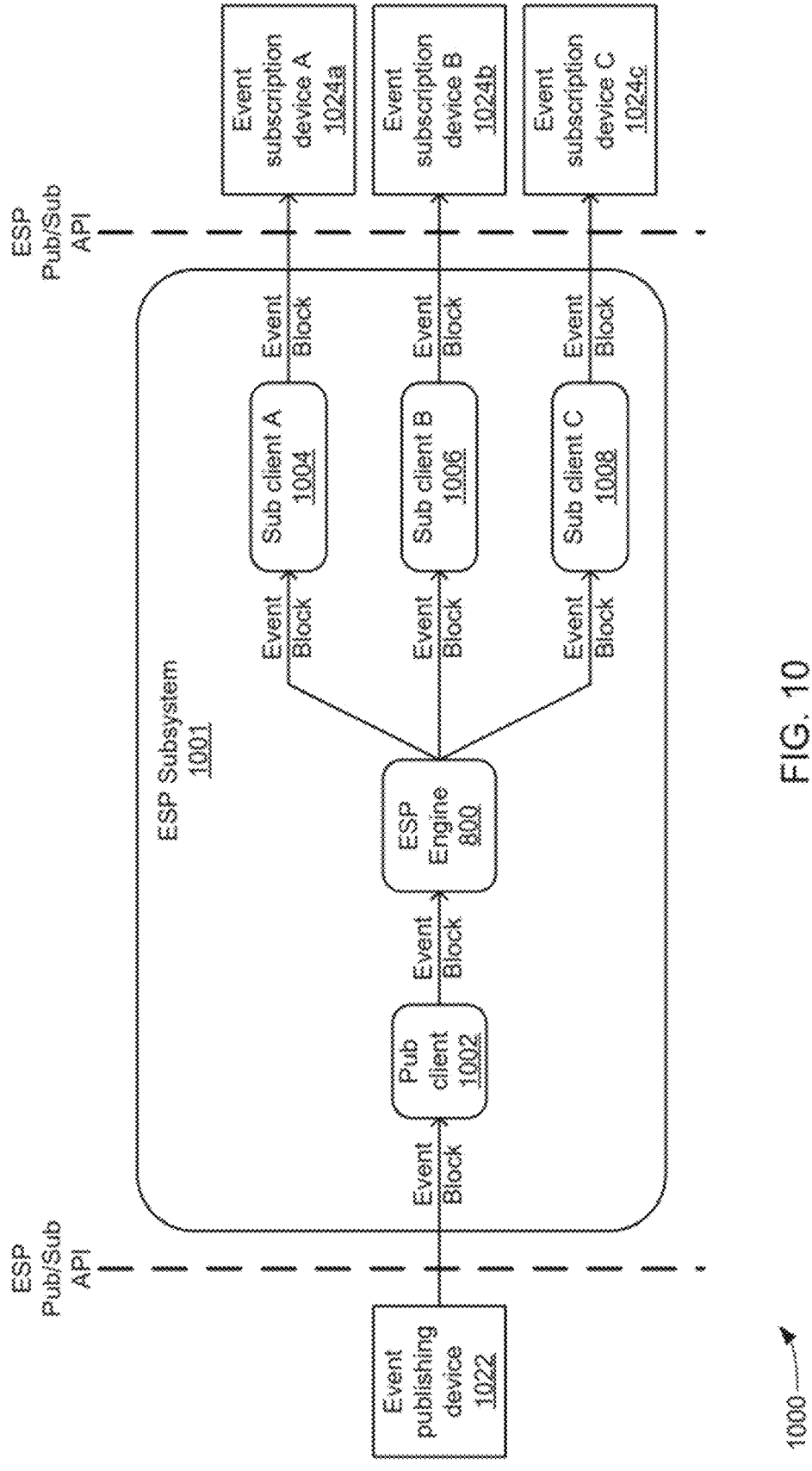
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
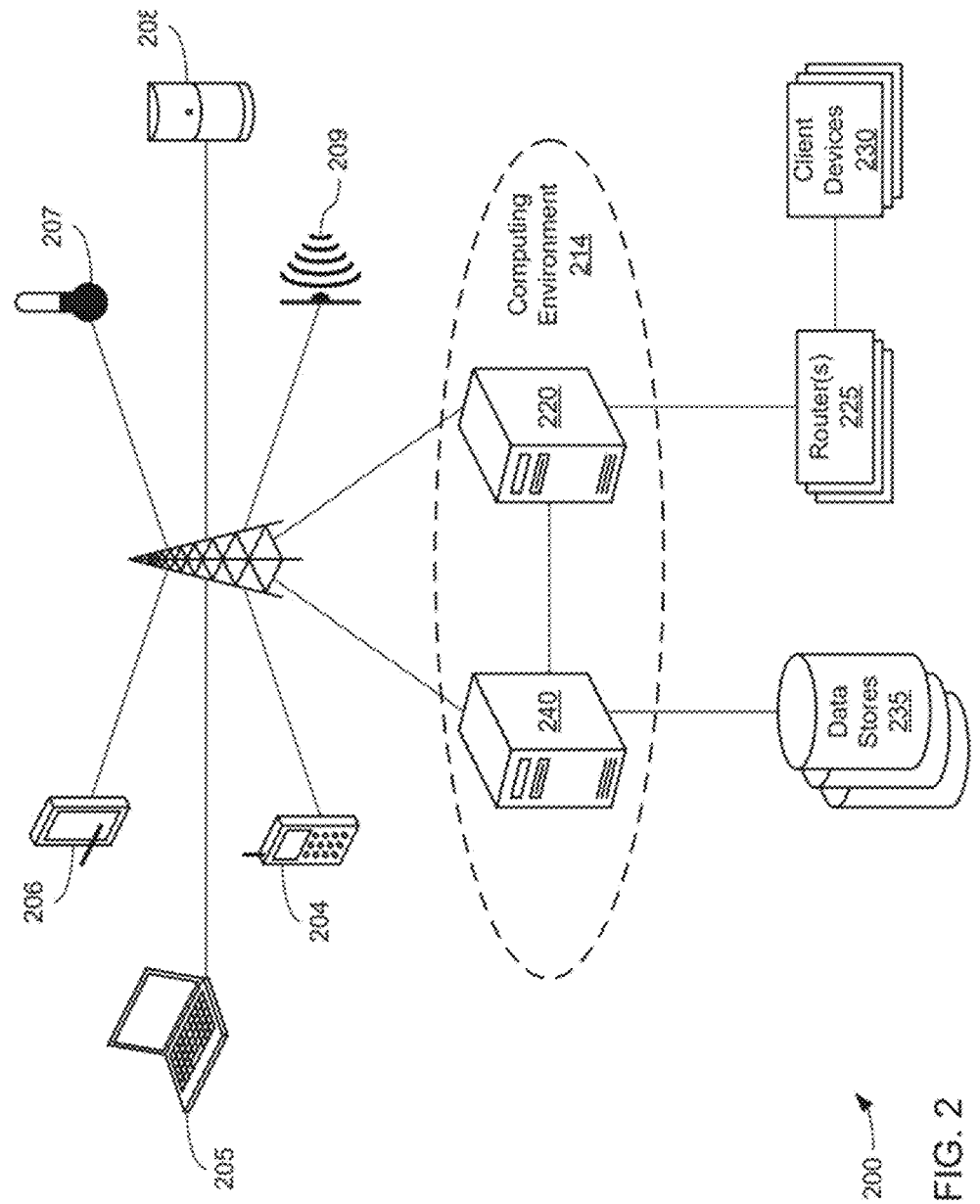
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
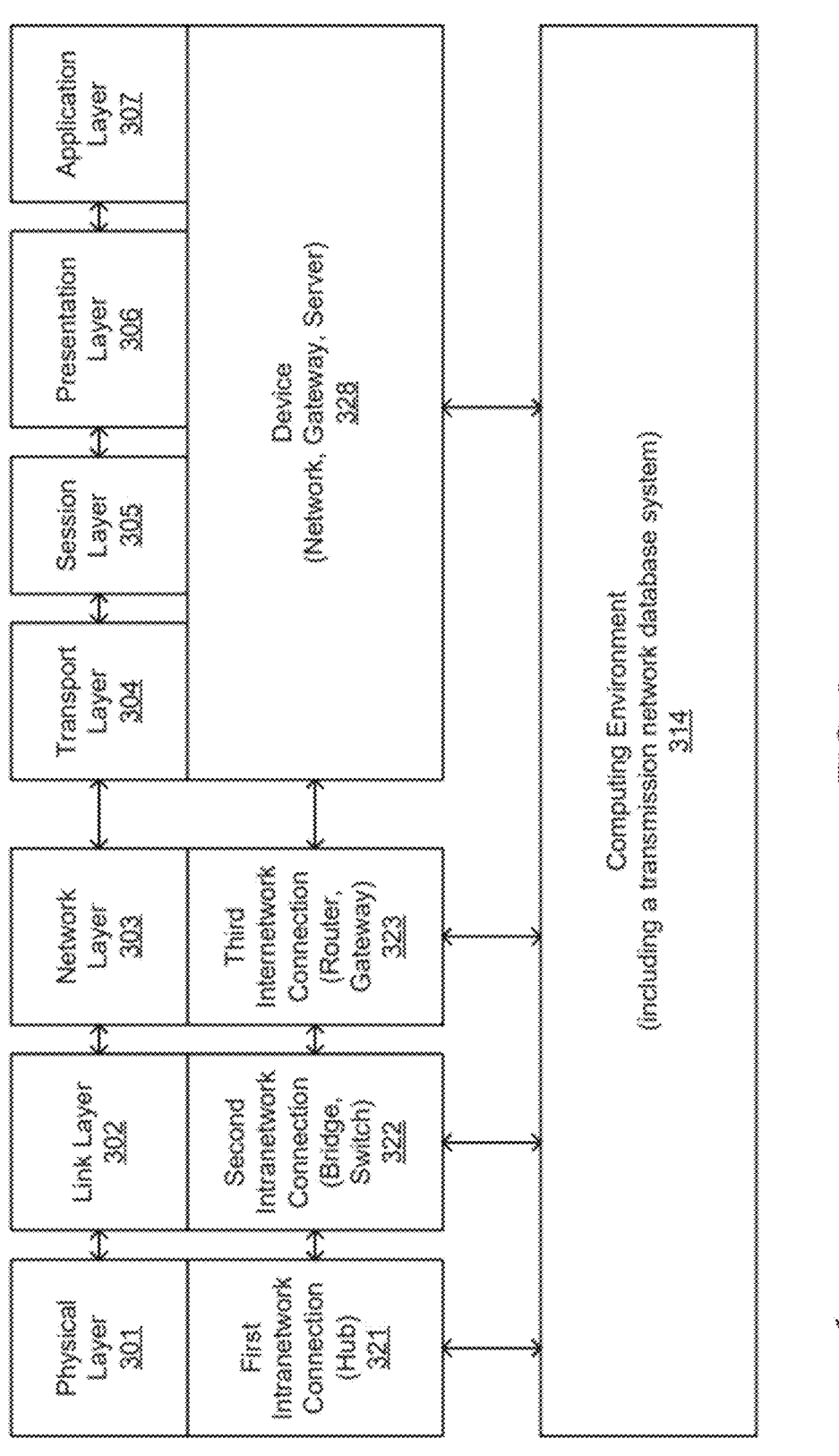
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
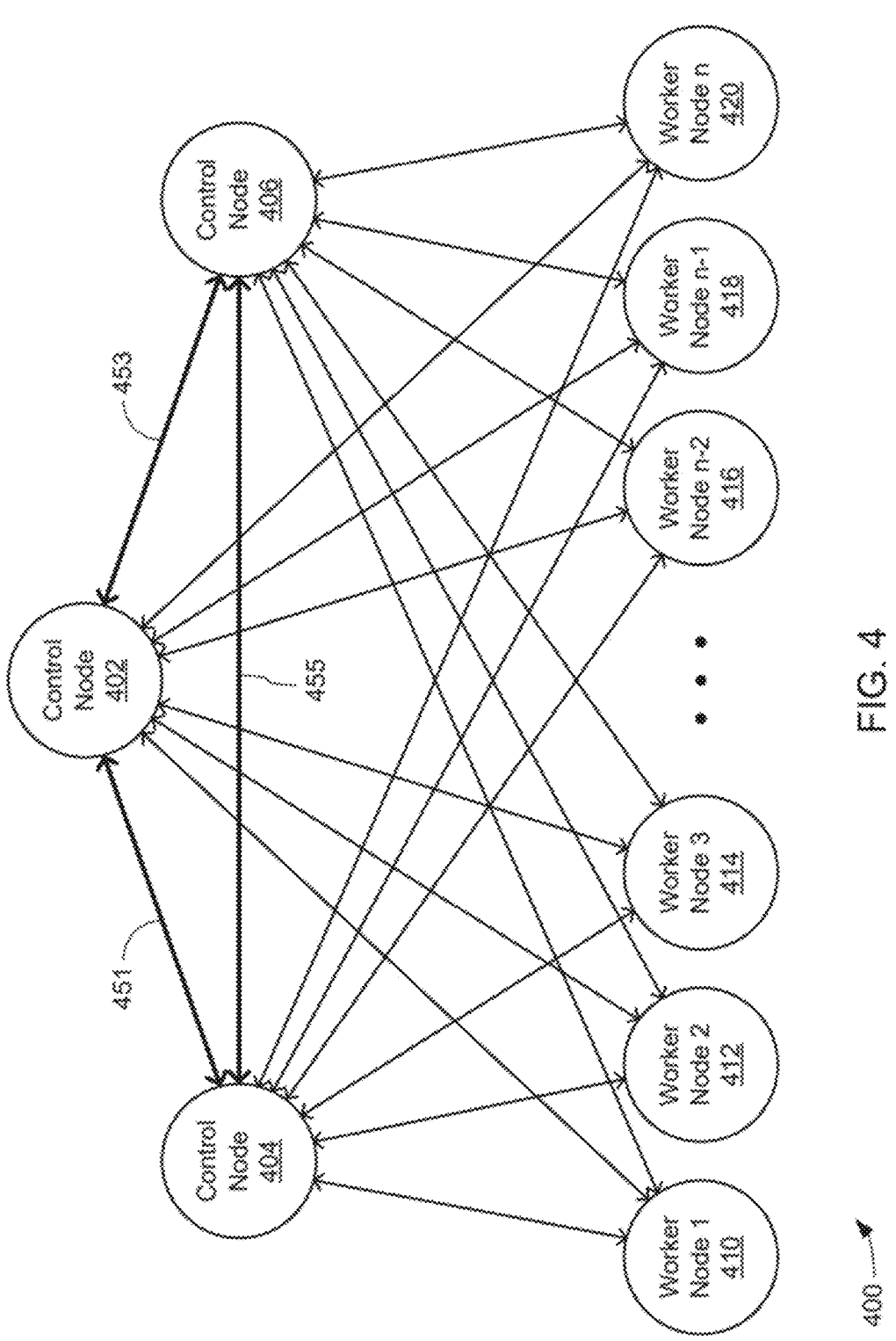
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and restart the project from that checkpoint to minimize lost progress on the project being executed.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
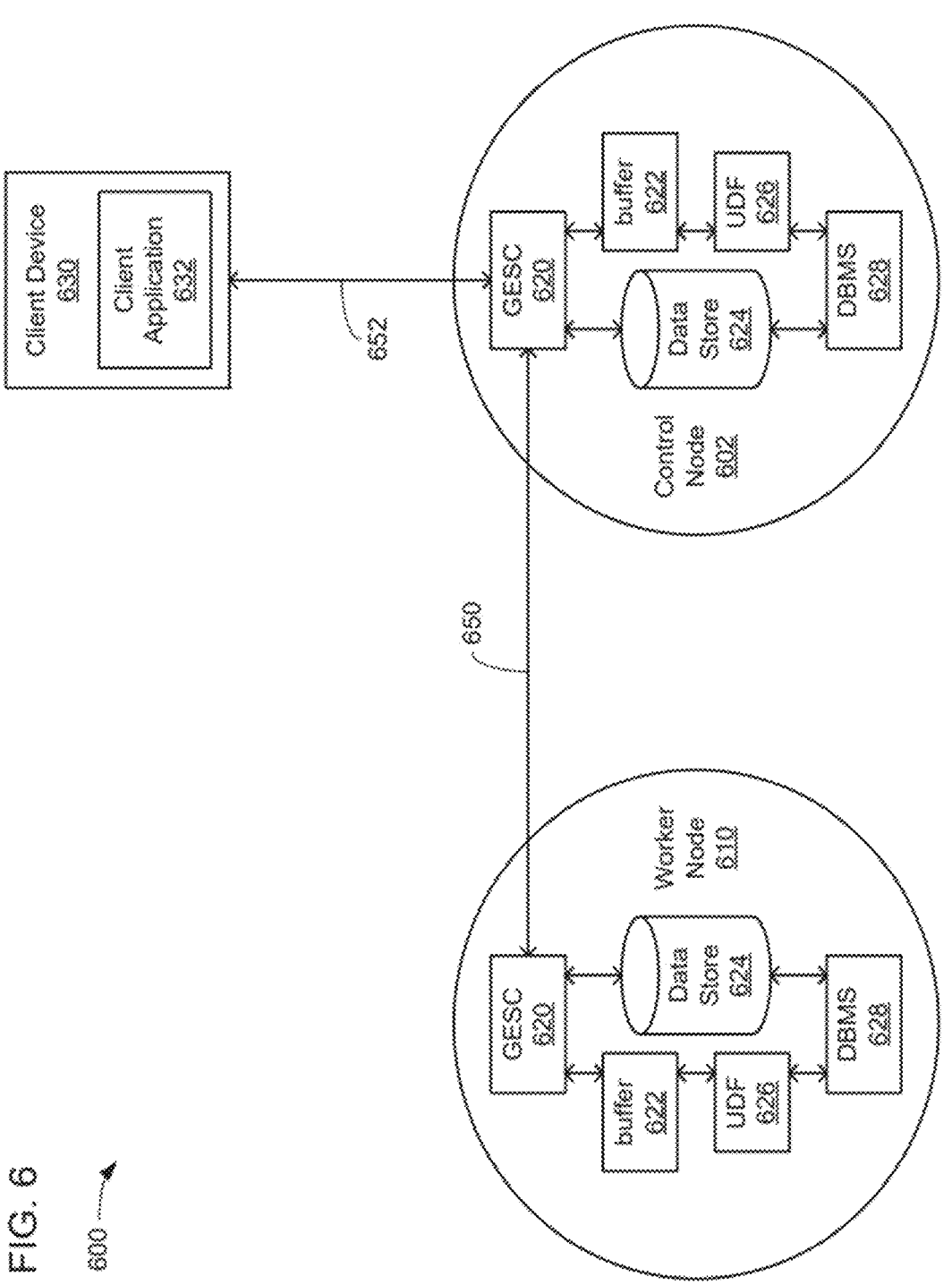
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a node 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
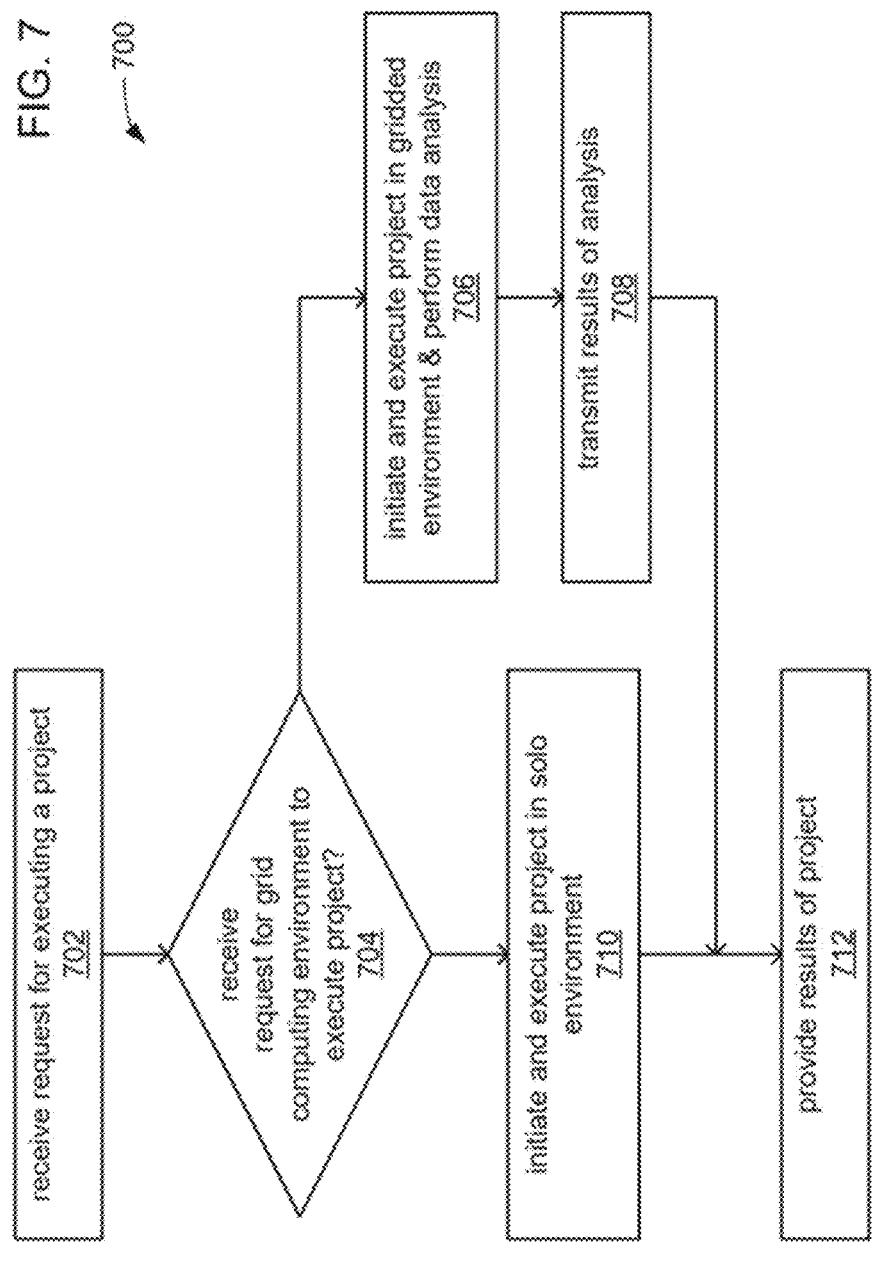
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device.

The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
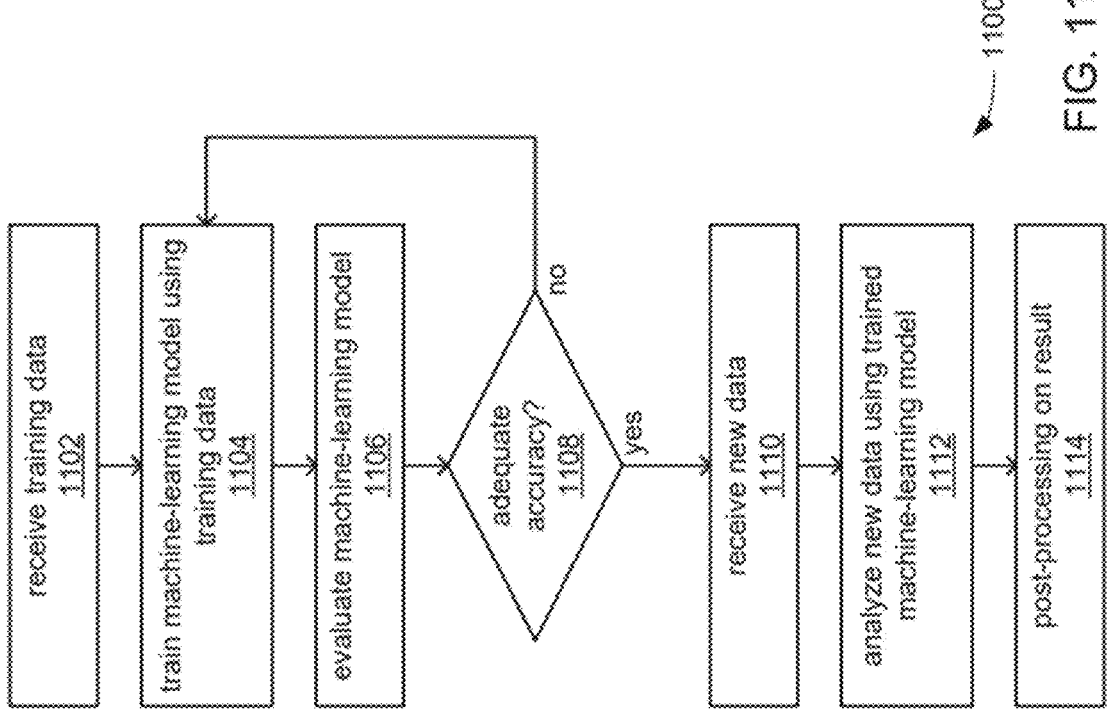
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Other networks may include transformers, large language models (LLMs), and agents for LLMs.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
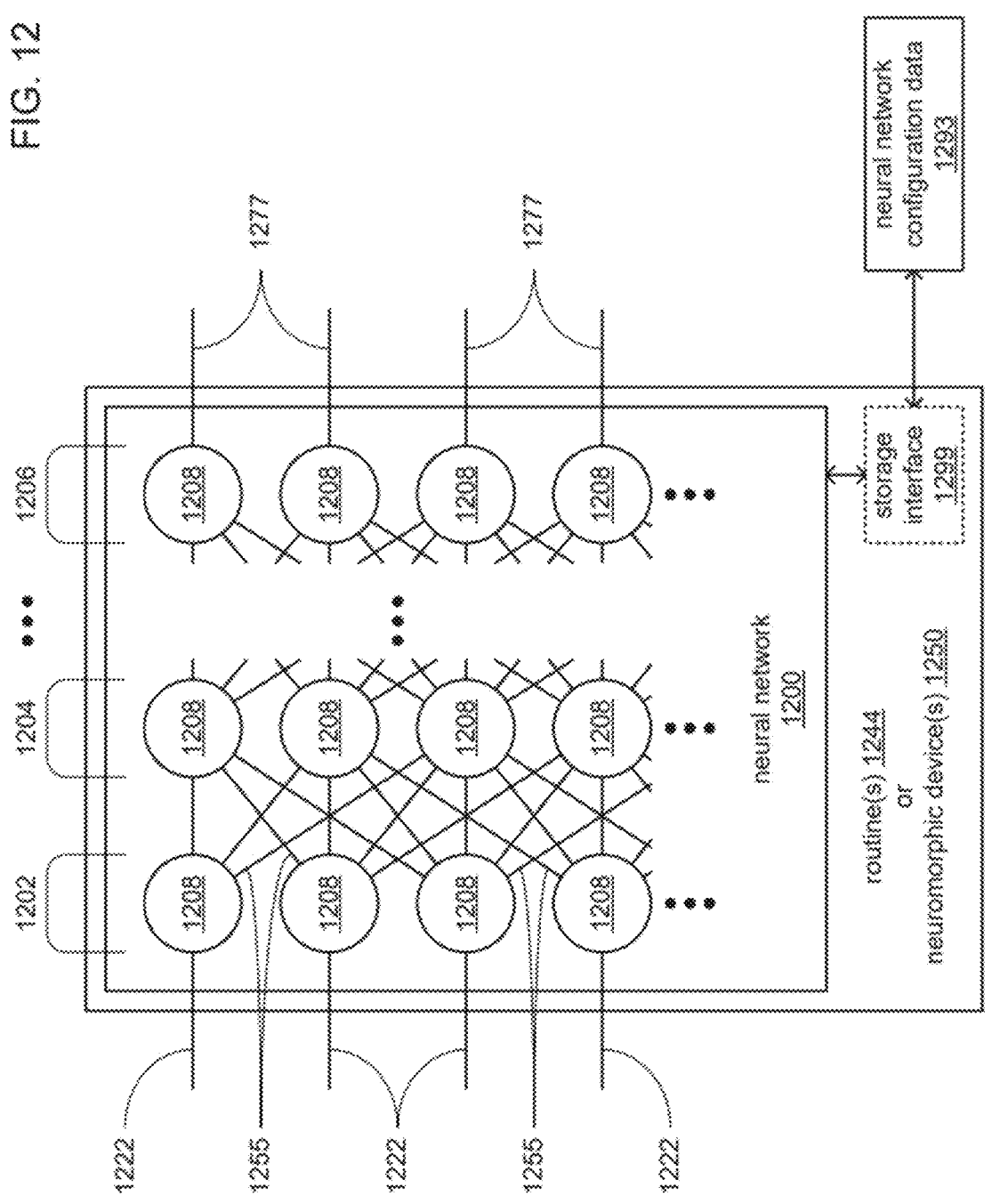
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
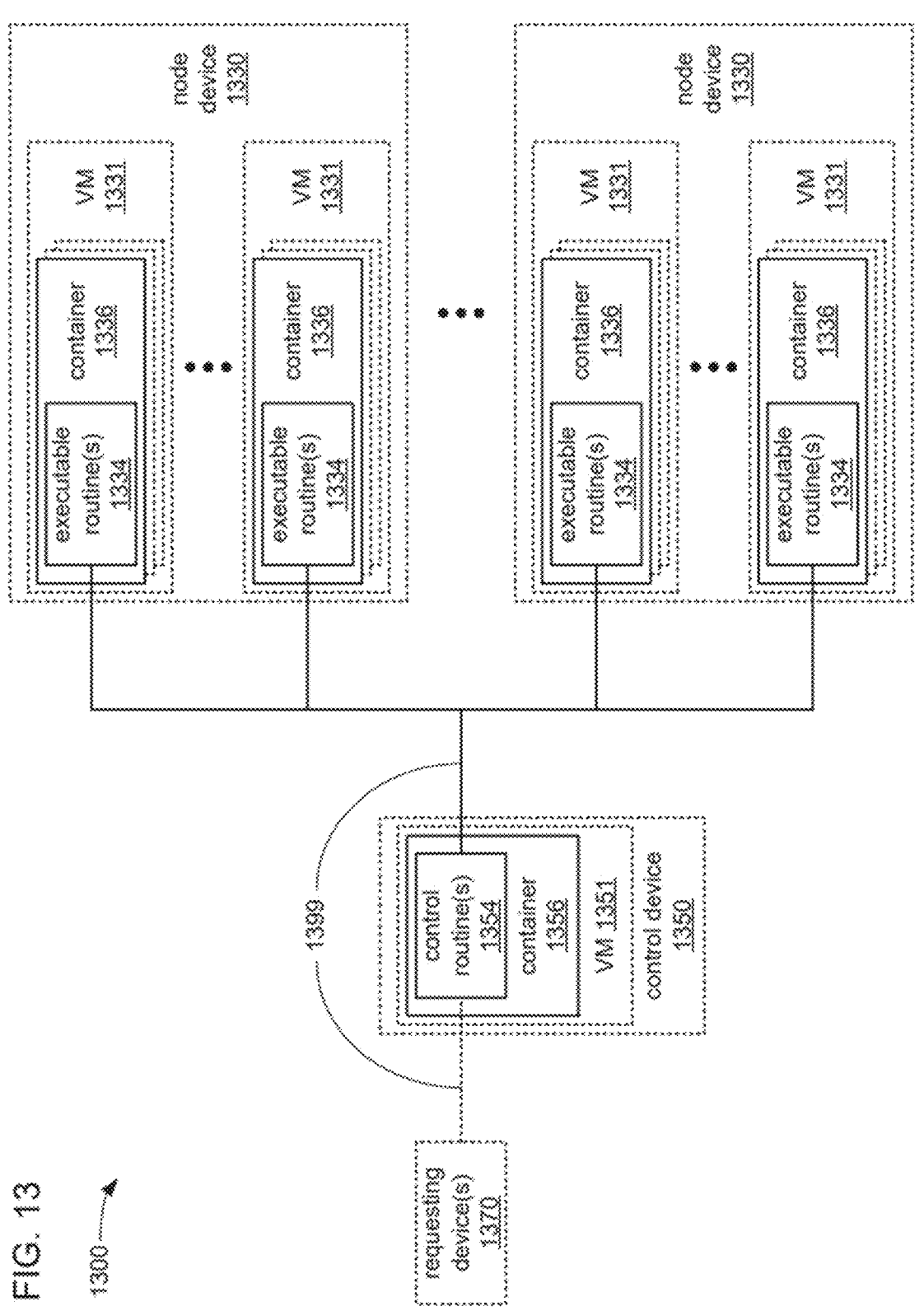
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14:
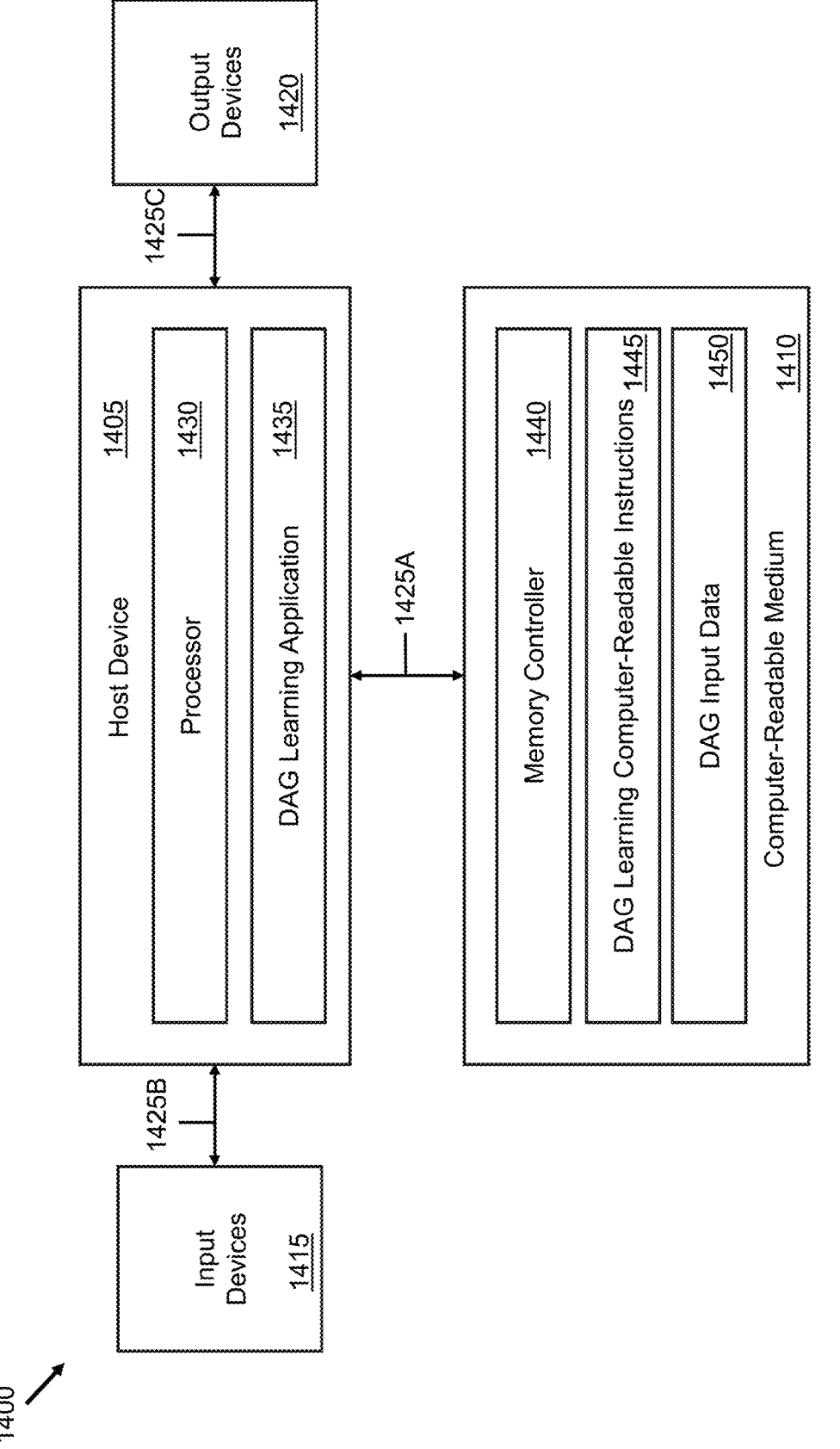
FIG. 14 illustrates a block diagram of an example DAG learning system, according to embodiments of the present technology.

Turning now to FIG. 14, a block diagram of an example Directed Acyclic Graph (DAG) learning system 1400 is shown, in accordance with some embodiments of the present disclosure. The DAG learning system 1400 may be part of, or otherwise associated with, the computing environment 114. The DAG learning system 1400 includes a host device 1405 associated with a computer-readable medium 1410. The host device 1405 may be configured to receive input from one or more input devices 1415 and provide output to one or more output devices 1420. The host device 1405 may be configured to communicate with the computer-readable medium 1410, the input devices 1415, and the output devices 1420 via appropriate communication interfaces, buses, or channels 1425A, 1425B, and 1425C, respectively. The DAG learning system 1400 may be implemented in a variety of computing devices such as computers (e.g., desktop, laptop, etc.), servers, tablets, personal digital assistants, mobile devices, wearable computing devices such as smart watches, other handheld or portable devices, or any other computing units suitable for performing operations described herein using the host device 1405.

Further, some or all of the features described in the present disclosure may be implemented on a client device, an on-premise server device, a cloud/distributed computing environment, or a combination thereof. Additionally, unless otherwise indicated, functions described herein as being performed by a computing device (e.g., the DAG learning system 1400) may be implemented by multiple computing devices in a distributed environment, and vice versa.

The input devices 1415 may include any of a variety of input technologies such as a keyboard, stylus, touch screen, mouse, track ball, keypad, microphone, voice recognition, motion recognition, remote controllers, input ports, one or more buttons, dials, joysticks, point of sale/service devices, card readers, chip readers, and any other input peripheral that is associated with the host device 1405 and that allows an external source, such as a user, to enter information (e.g., data) into the host device and send instructions to the host device 1405. Similarly, the output devices 1420 may include a variety of output technologies such as external memories, printers, speakers, displays, microphones, light emitting diodes, headphones, plotters, speech generating devices, video devices, and any other output peripherals that are configured to receive information (e.g., data) from the host device 1405. The "data" that is either input into the host device 1405 and/or output from the host device may include any of a variety of textual data, numerical data, alphanumerical data, graphical data, video data, sound data, position data, combinations thereof, or other types of analog and/or digital data that is suitable for processing using the DAG learning system 1400.

The host device 1405 may include a processor 1430 that may be configured to execute instructions for running one or more applications associated with the host device 1405. In some embodiments, the instructions and data needed to run the one or more applications may be stored within the computer-readable medium 1410. The host device 1405 may also be configured to store the results of running the one or more applications within the computer-readable medium 1410. One such application on the host device 1405 may be a DAG learning application 1435. The DAG learning application 1435 may be used to learn or otherwise automatically generate a topological order for a DAG based on a plurality of datasets. The DAG learning application 1435 may also be used to perform causal discovery and/or causal estimation or be associated with systems that perform causal discovery and/or causal estimation.

The DAG learning application 1435 may be executed by the processor 1430. The instructions to execute the DAG learning application 1435 may be stored within the computer-readable medium 1410. To facilitate communication between the host device 1405 and the computer-readable medium 1410, the computer-readable medium may include or be associated with a memory controller 1440. Although the memory controller 1440 is shown as being part of the computer-readable medium 1410, in some embodiments, the memory controller may instead be part of the host device 1405 or another element of the DAG learning system 1400 and operatively associated with the computer-readable medium 1410. The memory controller 1440 may be configured as a logical block or circuitry that receives instructions from the host device 1405 and performs operations in accordance with those instructions. For example, to execute the DAG learning application 1435, the host device 1405 may send a request to the memory controller 1440. The memory controller 1440 may read the instructions associated with the DAG learning application 1435. For example, the memory controller 1440 may read DAG learning computer-readable instructions 1445 stored within the computer-readable medium 1410 and send those instructions back to the host device 1405. In some embodiments, those instructions may be temporarily stored within a memory on the host device 1405. The processor 1430 may then execute those instructions by performing one or more operations called for by those instructions.

The computer-readable medium 1410 may include one or more memory circuits. The memory circuits may be any of a variety of memory types, including a variety of volatile memories, non-volatile memories, or a combination thereof. For example, in some embodiments, one or more of the memory circuits or portions thereof may include NAND flash memory cores. In other embodiments, one or more of the memory circuits or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the computer-readable medium 1410. In some embodiments, one or more of the memory circuits or portions thereof may be configured as other types of storage class memory ("SCM"). Generally speaking, the memory circuits may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

The computer-readable medium 1410 may also be configured to store DAG input data 1450. The DAG input data 1450 may include, and/or be used to generate, observation vectors for use by the DAG learning application 1435.

It is to be understood that only some components of the DAG learning system 1400 are shown and described in FIG. 14. However, the DAG learning system 1400 may include other components such as various batteries and power sources, networking interfaces, routers, switches, external memory systems, controllers, etc. Generally speaking, the DAG learning system 1400 may include any of a variety of hardware, software, and/or firmware components that are needed or considered desirable in performing the functions described herein. Similarly, the host device 1405, the input devices 1415, the output devices 1420, and the computer-readable medium 1410, including the memory controller 1440, may include hardware, software, and/or firmware components that are considered necessary or desirable in performing the functions described herein.

Learning a DAG may include determining a topological order of a DAG. Learning a DAG may also include determining a correct set of edges between nodes or vertices of the DAG. Each node of a DAG may correspond to one variable among a set of variables. Variables may represent tasks, data, entities, etc. Each edge between two variables may correspond to a relationship or dependency between the two connected variables. A DAG is, therefore, a versatile structure that allows efficient representation and analysis of dependencies between variables. DAGs may be useful in describing complex processes and have wide-reaching applications, such as in machine learning (e.g., for deep learning), cryptocurrency and blockchain, communication networks, utilities, retail and marketing, forensics, biology and life sciences, data processing, versioning, scheduling, etc.

Depending on the number of variables and the complexity of the dependencies between those variables, learning a DAG may be quite challenging. For example, basic DAGs with a small number of variables having straightforward dependencies may be created manually by industry experts. However, as the number of variables increases and/or the dependencies between variables become more complex, as in most real-world applications, manually creating DAGs becomes infeasible. For example, determining the correct topological order of a DAG is a known combinatorial NP-hard problem that scales super-exponentially with the number of variables in the DAG. In other words, for a number of variables, n, the number of possible topological orders for a DAG may be n!:

TABLE 1

| n | n! |
|---|---|
| 5 | 120 |
| 6 | 720 |
| 7 | 5040 |
| 8 | 40320 |
| 9 | 362880 |
| 10 | 3628800 |
| 11 | 39916800 |
| 12 | 4.79E+08 |
| 13 | 6.23E+09 |
| 14 | 8.72E+10 |
| 15 | 1.31E+12 |
| 16 | 2.09E+13 |
| 17 | 3.56E+14 |
| 18 | 6.4E+15 |
| 19 | 1.22E+17 |
| 20 | 2.43E+18 |

As seen from Table 1 above, even for 20 variables, the number of possible topological orders for a DAG may be more than 2 quintillion ($10^{18}$), which may take weeks or months to create manually by industry experts. Real-world applications often have hundreds or thousands of variables having an astronomical number of possible topological orders. Given the constraints associated with manually determining the topological order of a DAG, for real-world applications, manually determining the topological order is not practical and potentially impossible. Further, determining the topological order of a DAG is only part of the process of learning a DAG. The determination of the correct set of edges also scales exponentially with the number of variables. In particular, for n variables, the possible options for a correct set of edges may be represented by $2^n-2$, as shown in Table 2 below:

TABLE 2

| n | $2^n-2$ |
|---|---|
| 5 | 30 |
| 6 | 62 |
| 7 | 126 |
| 8 | 254 |
| 9 | 510 |
| 10 | 1022 |
| 11 | 2046 |
| 12 | 4094 |
| 13 | 8190 |
| 14 | 16382 |
| 15 | 32766 |
| 16 | 65534 |

TABLE 2-continued

| n | $2^n - 2$ |
|---|---|
| 17 | 131070 |
| 18 | 262142 |
| 19 | 524286 |
| 20 | 1048574 |

Therefore, given the large set of possibilities of both the topological order and the correct set of edges, learning a DAG manually by an industry expert is infeasible and undesirable. While software tools, libraries, and algorithms have now become available to assist with learning a DAG, such tools, libraries, and algorithms are often insufficient and suffer from deficiencies. For example, DAGs learned by these mechanisms may be inaccurate, consume inordinate amounts of computing resources, and/or be too slow.

Because DAGs are used to represent dependencies and relationships between variables, accuracy of a DAG is critical in making accurate inferences from the DAG. For example, when a DAG is used for data processing or task scheduling, accuracy of a DAG may impact the execution of the data processing tasks or task scheduling. As an example, if dependencies are not accurately represented in DAG, tasks may be executed in the wrong order, with wrong inputs, may cause system breakdown, computability issues, errors, etc., and may lead to incorrect results. By accurately representing DAGs, unnecessary delays, redundant computations, or downstream corrections may be avoided. In certain applications where DAGs are used for modeling and analysis, the accuracy of a DAG is critical in making informed, correct, and predictable decisions using the DAG. The accuracy of a DAG may directly impact the reliability, efficiency, predictability, and otherwise successful implementation of applications that rely on DAGs.

In addition to accuracy, the speed of learning a DAG and the consumption of computing resources may be important considerations when learning a DAG. Given the large number of possibilities of topological orders and the correct set of edges, large amounts of computing resources are needed to learn a DAG. The speed at which a DAG is accurately learned may also be critical, particularly in applications with frequently changing variables and/or dependencies.

Technical solutions for learning a DAG are provided herein that are accurate and faster than existing solutions while consuming significantly less computing resources. In particular, experiments comparing the proposed approach with a conventional approach found that the proposed approach is at least as accurate (and more accurate as the number of variables increases) as the conventional approach, while providing at least a 50% speedup relative to the conventional approach. In other words, the proposed approach is able to determine the topological order of a DAG at least 50% faster than the conventional approach. The greater the number of variables, the greater is the amount of relative speedup with the proposed approach. In addition, this speedup in the proposed approach is achieved using a single Central Processing Unit (CPU) running in a Symmetric Multi-Processor (SMP) mode compared to multiple (e.g., 2000) CPUs running in a Massive Parallel Processor (MPP) mode that are needed in the conventional approach. Thus, the proposed approach provides technical improvements that consume less computing resources and learn a DAG much faster than the conventional approach, while providing the same or greater accuracy as the conventional approach. Additional details of the experiments are provided below.

The proposed approach for learning a DAG is based on an assumption for minimizing conditional variances that indicates that a correct topological order for a DAG corresponds to a best score when for each value of a first index that ranges between 1 and the number of variables n minus 1, and for each value of a second index that is greater than the value of the first index, a conditional variance of a variable corresponding to the first index is less than or equal to a conditional variance of a variable corresponding to the second index. The proposed approach uses a SWEEP operator to calculate the conditional variances quickly. Thus, the proposed approach provides a particular mechanism for using raw data (e.g., observation vectors) collected from real-world applications to learn the DAG and use the learned DAG for making causal inferences more accurately.

Figure 15:
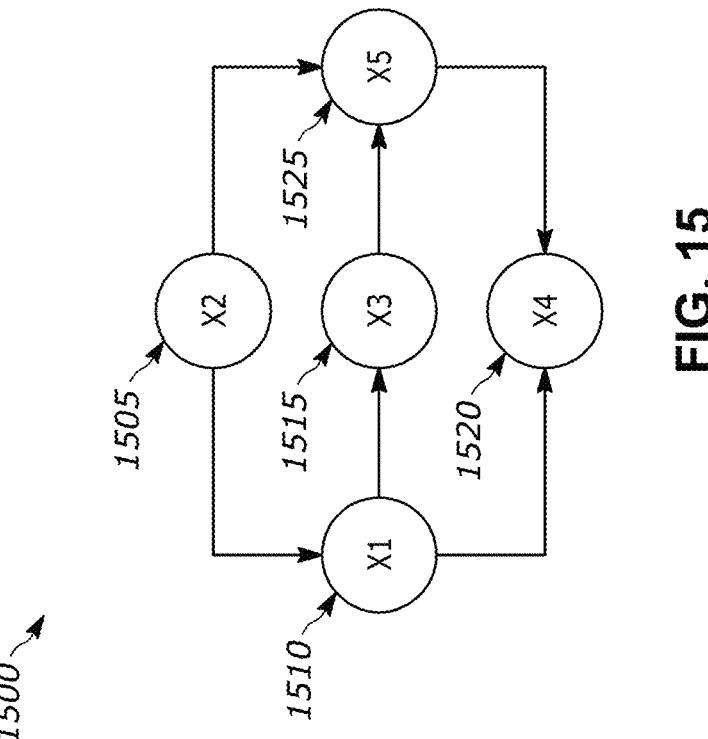
FIG. 15 illustrates an example DAG, according to embodiments of the present technology.

Turning to FIG. 15, an example of a DAG 1500 is shown, in accordance with some embodiments of the present disclosure. The DAG 1500 includes a plurality of vertices, also referred to as nodes. For example, the DAG 1500 includes a first node 1505, a second node 1510, a third node 1515, a fourth node 1520, and a fifth node 1525. Although the DAG 1500 includes five nodes, the DAG may include any number of nodes. Generally speaking, in real world applications, the DAG 1500 may include hundreds or thousands of nodes. Each node in the DAG 1500 may be representative of a variable in a dataset. For example, the first node 1505 is associated with a variable X2, the second node 1510 is associated with a variable X1, the third node 1515 is associated with a variable X3, the fourth node 1520 is associated with a variable X4, and the fifth node 1525 is associated with a variable X5.

Relationships between two variables of the DAG 1500 may be represented by one or more directed edges. A directed edge is an edge that is directed (e.g., has a direction) from one node to another. The DAG 1500 does not include any directed loops. A directed loop or closed loop occurs when starting from one node and traveling along the directed edges, a starting node may be reached. When there is a directed edge from a node x to a node y, node x is a parent of node y, or equivalently, node y is a child of node x. For example, based on the directed edges shown in the DAG 1500, the first node 1505 is a parent of the second node 1510 and of the fifth node 1525; the second node 1510 is a parent of the third node 1515 and of the fourth node 1520; the third node 1515 is a parent of the fifth node 1525; and the fifth node 1525 is a parent of the fourth node 1520. Because there does not exist a directed edge going into the first node 1505, the first node has no parent. Also, because the fourth node 1520 has no directed edge going out therefrom, the fourth node has no children.

In other words, the variable X2 is a parent of the variable X1 and of variable X5; the variable X1 is a parent of the variable X3 and of the variable X4; the variable X3 is a parent of the variable X5; the variable X5 is a parent of the variable X4; and the variable X4 has no children. All parents of a node construct a parent set of that node. For example, Table 3 below summarizes the parent set for each variable included in the DAG 1500.

TABLE 3

| Variable | Parent Set |
|---|---|
| X1 | {X2} |
| X2 | { } |
| X3 | {X1} |

TABLE 3-continued

| Variable | Parent Set |
|---|---|
| X4 | {X1, X5} |
| X5 | {X2, X3} |

The DAG 1500 has a topological order. A topological order may define the order in which the nodes of a DAG are to be traversed such that a node x is visited only after all the dependencies (e.g., parents) of that node x have been visited. In other words, if there is a directed edge from a node x to a node y, the node x is traversed before the node y. The topological order of a DAG may be considered a linear ordering of the nodes and may be represented by a vector, r. For example, in the DAG 1500, the second node 1510 may be traversed only after the first node 1505 has been traversed. Thus, the second node 1510 may come after the first node 1505 in the topological order of the DAG 1500. Similarly, the third node 1515 may be traversed only after the second node 1510 has been traversed, the fourth node 1520 may be traversed only after both the second node and the fifth node 1525 have been traversed, while the fifth node may be traversed only after both the third node and the first node have been traversed. Thus, the order in which the variables of the DAG 1500 may be traversed may be represented as {X2, X1, X3, X5, X4}, which may correspond to a topological vector, r={2, 1, 3, 5, 4}. Because a DAG captures relationships between its variables by way of the directed edges, the correct topological order needs to be known to make correct relationship estimations.

Figure 16A:
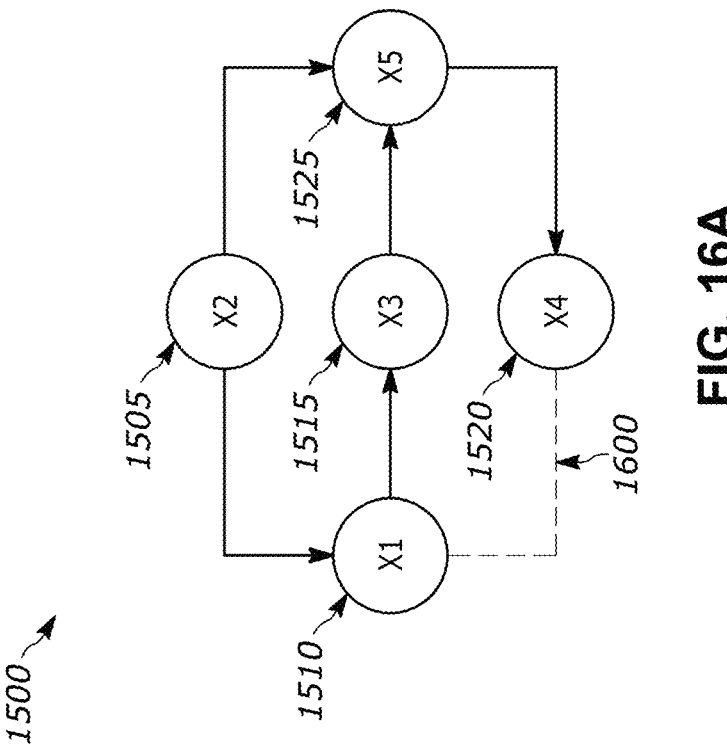
FIG. 16A illustrates an example of a missing edge error in the DAG of FIG. 15, according to embodiments of the present technology.
Figures 16B, 16C:
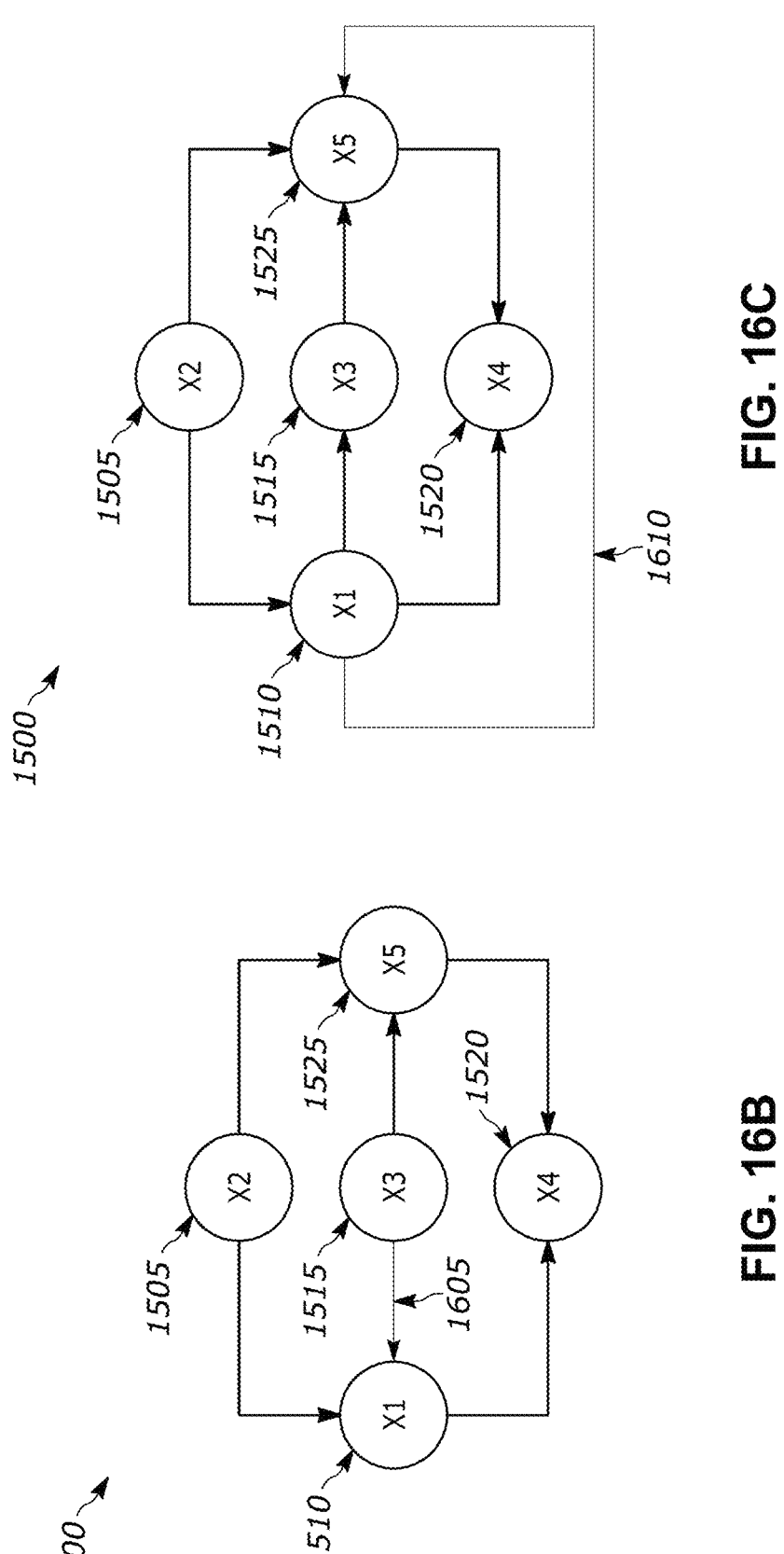
FIG. 16B illustrates an example of a reverse edge error in the DAG of FIG. 15, according to embodiments of the present technology.
FIG. 16C illustrates an example of an extra edge error in the DAG of FIG. 15, according to embodiments of the present technology.

In some embodiments, errors in the directed edges of a DAG may result during the DAG learning process. For example, FIGS. 16A-16C show example errors that may occur while learning the DAG 1500. FIG. 16A shows a missing edge error in which a directed edge 1600 between the second node 1510 and the fourth node 1520 is missing in the DAG 1500. FIG. 16B shows a reverse edge error in which a directed edge 1605 between the second node 1510 and the third node 1515 may be pointing in the wrong direction in the DAG 1500. FIG. 16C shows an extra edge error in which an extra directed edge 1610 may exist between the second node 1510 and the fifth node 1525 in the DAG 1500. Such errors may lead to incorrect causal inferences. In some embodiments, the total errors in a DAG (e.g., the DAG 1500) may be represented by a Structural Hamming Distance (SHD). In some embodiments, SHD may be a sum of a number of missing edges (e.g., the edge 1600), number of reverse edges (e.g., the edge 1605), and a number of extra edges (e.g., the edge 1610):

$$SHD = \#\text{Missing edges} + \#\text{Reverse edges} + \#\text{Extra edges} \qquad \text{Equation 1}$$

The accuracy of a DAG may be determined based on the SHD. A lower value of the SHD may be desired during the DAG learning process. In general, lower the value of SHD, higher the accuracy of the topological order. For example, an SHD of zero may indicate that there are no edge related errors in a DAG (e.g., the DAG 1500).

Figure 17:
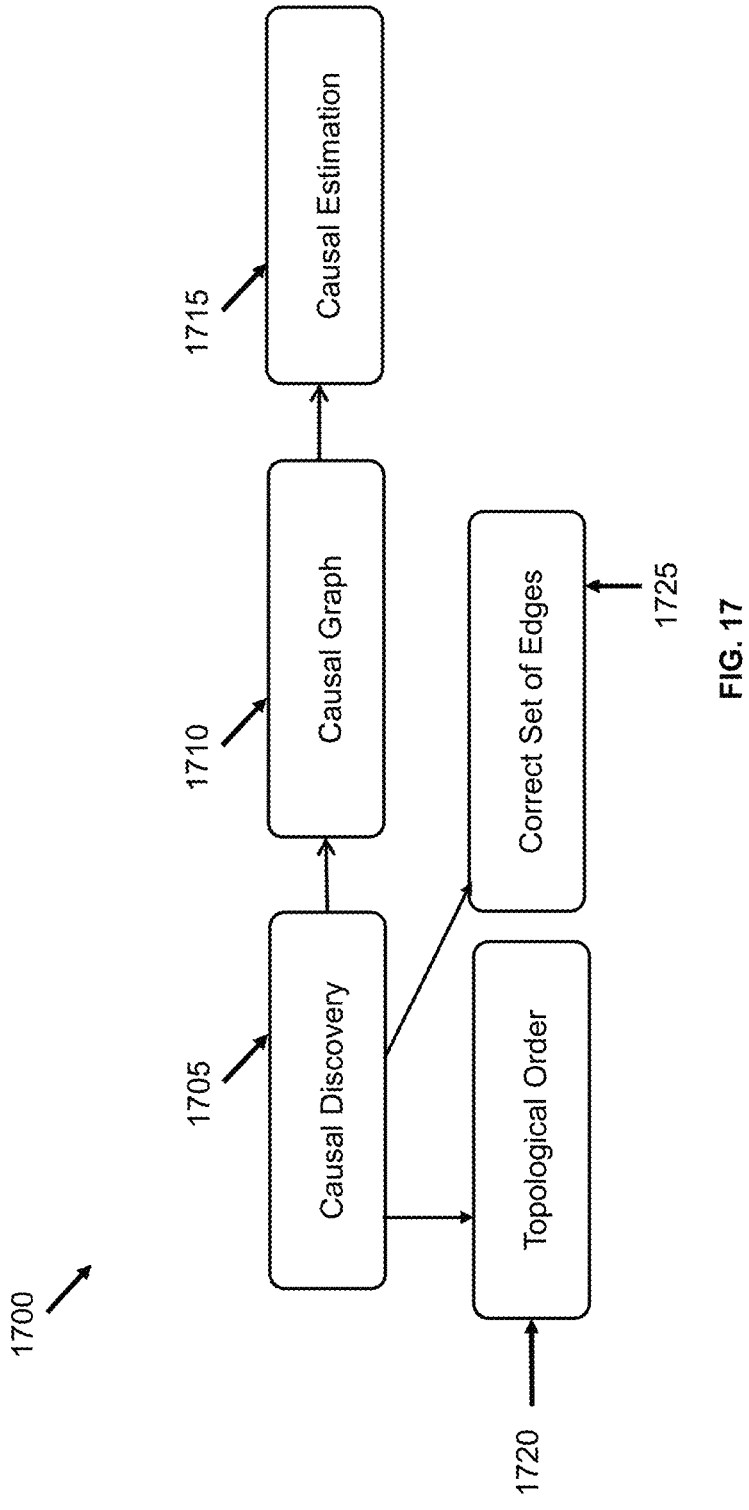
FIG. 17 illustrates a flowchart showing an example process for making causal inferences using causal graphs, according to embodiments of the present technology.

Turning now to FIG. 17, a high-level block diagram of a causal inference process 1700 is shown, in accordance with some embodiments of the present disclosure. Causal inference is the analysis of data for uncovering causal relationships between variables. In other words, the causal inference process 1700 may provide answers to questions that something is, or is likely to be, the cause of something else. For example, in some embodiments, the causal inference process 1700 may provide answers to "why" or "what if" type questions. In other embodiments, the causal inference process 1700 may be used to provide answers to other or additional types of questions. The causal inference process 1700 may have wide reaching applications. For example, in the context of epidemiology, causal inference may study patterns of health and disease based on certain aspects of a particular population. As another example, causal inference may be used to investigate how supply and demand depend on pricing or governmental policies. It is to be understood that any examples used herein are only for explanation purposes, and not intended to be limiting the disclosure in any way. The causal inference process 1700 may leverage machine learning and artificial intelligence to analyze data. In some embodiments, the causal inference process 1700 may be performed based on observation of the data. In some embodiments, the observed data may be transformed into a causal graph.

Thus, in some embodiments, the causal inference process 1700 may include causal discovery 1705, learning a causal graph 1710, and causal estimation 1715. The causal discovery 1705 may involve identifying which variables are relevant for performing the causal inference process 1700. In particular, the causal discovery 1705 may learn the causal graph 1710, and the analysis of the causal graph 1710 determines which variables to use and which variables to discard when performing the causal estimation 1715. A variable may identify a property, element, or feature, factor, or otherwise characteristic of something. The variables may be dependent on the specific application. For example, if the application involves operation of a vehicle, the variables may include a type of vehicle, an oil pressure, a speed, a gear indicator, a gas tank level, a tire pressure for each tire, an engine temperature, a radiator level, etc. One or more variables in some embodiments may include time and/or date, or other measurable parameters.

In addition to identifying the variables, the causal discovery 1705 may involve gathering data values for each of the identified variables. In some embodiments, the data values may be provided by a field expert. In other embodiments, the data values may be gathered in other ways. In some embodiments, the variables and their associated data values may be considered the DAG input data 1450. In some embodiments, the DAG input data 1430 may include data captured as a function of time. For example, in some embodiments, the DAG input data 1430 may be captured at different time points, periodically, intermittently, when an event occurs, etc. In some embodiments, the DAG input data 1430 may include data captured at a high data rate such as 200 or more observation vectors per second or other suitable rates. In some embodiments, the DAG input data 1430 may include data captured under normal and abnormal operating conditions.

Further, in some embodiments, the DAG input data 1430 may be received directly or indirectly from the source and may or may not be pre-processed in some manner. For example, in some embodiments, the DAG input data 1430 may be pre-processed using an event stream processor such as the SAS® Event Stream Processing Engine (ESPE), developed and provided by SAS Institute Inc. of Cary, N.C., USA. For example, in some embodiments, the DAG input data 1430 may be generated as part of the Internet of Things (IoT), where things (e.g., machines, devices, phones, sensors) may be connected to networks and the data from these things collected and processed within the things and/or external to the things before being stored in the DAG input data. In some embodiments, the DAG input data 1430 may reside in the cloud or in an edge device.

In some embodiments, the DAG input data 1430 may include any type of content represented in any computer-readable format such as binary, alphanumeric, numeric, string, markup language, etc. The content may include textual information, numeric information, etc. that further may be encoded using various encoding techniques as understood by a person of skill in the art. The DAG input data 1430 may be stored in various compressed formats such as a coordinate format, a compressed sparse column format, a compressed sparse row format, etc. The DAG input data 1430 may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools. In some embodiments, the DAG input data 1430 may be stored using various data structures including one or more files of a file system, a relational database, one or more tables of a system of tables, a structured query language database, etc.

Thus, in some embodiments, the causal discovery 1705 may involve obtaining the DAG input data 1450. In some embodiments, the DAG input data 1450 may be arranged in a plurality of rows and a plurality of columns. Each row of the plurality of rows may be referred to as an "observation vector" or "observation record." Each column of the plurality of columns may be associated with one variable. Thus, for rows i=1, 2, . . . N, where N is the number of observation vectors, and for columns, j=1, 2, . . . , n, where n is the number of variables identified from the causal discovery 1705, an observation vector $x_i$ may have a value $x_{ij}$ associated with a row i and column j. An example vector $x_i$ may be given as: $\{x_{i1}, x_{i2}, \ldots, x_{in}\}$ where i=1, 2, . . . N. In some embodiments, the number of observation vectors in the DAG input data 1450 may be in the hundreds or thousands depending on the application. Likewise, in some embodiments, the number of variables may be in the hundreds or thousands depending on the application. In other embodiments, the data on the rows and columns may be transposed.

The observation vectors may be used to generate the causal graph 1710 by the DAG learning application 1435. Creating or learning the causal graph 1710 from the observation vectors is an NP-hard (where NP stands for non-deterministic polynomial time) problem. A computational problem, H, is said to be NP-hard if, for every problem, L, which may be solved in NP, there is a polynomial time reduction from L to H. In other words, if a problem, H, may be solved efficiently, the problem, L, may also be solved efficiently using the solution for H. NP-hard problems are computationally intensive. Thus, because creating the causal graph 1710 from the observation vectors is an NP-hard problem and NP-hard problems are computationally intensive, creating the causal graph is computationally intensive as well. The present disclosure provides a mechanism to generate the causal graph 1710 using fewer computational resources than existing mechanisms.

To generate the casual graph 1710, the causal discovery 1705 may first determine a topological order 1720 of the DAG based on the observation vectors and then find a correct set of edges 1725 (e.g., the existence of an edge between two variables) between the nodes according to the topological order. Determining the topological order 1720 of a DAG is discussed in more detail below. Finding the correct set of edges 1725 is discussed in greater detail in U.S. Pat. No. 11,443,198, filed on Nov. 9, 2021, and titled "Directed Acyclic Graph Machine Leaning System," the entirety of which is incorporated by reference herein.

The causal graph 1710 may then be used to perform the causal estimation 1715. In other words, the causal graph 1710 may be used to help quantify the impact or effect of the variables on the data in the causal estimation 1715, and answer the questions mentioned above. In some embodiments, the causal estimation 1715 may be performed by the DAG learning application 1435 as well. In other embodiments, the DAG learning application 1435 may provide the causal graph 1710 to an associated application for performing the causal estimation 1715.

Figure 18:
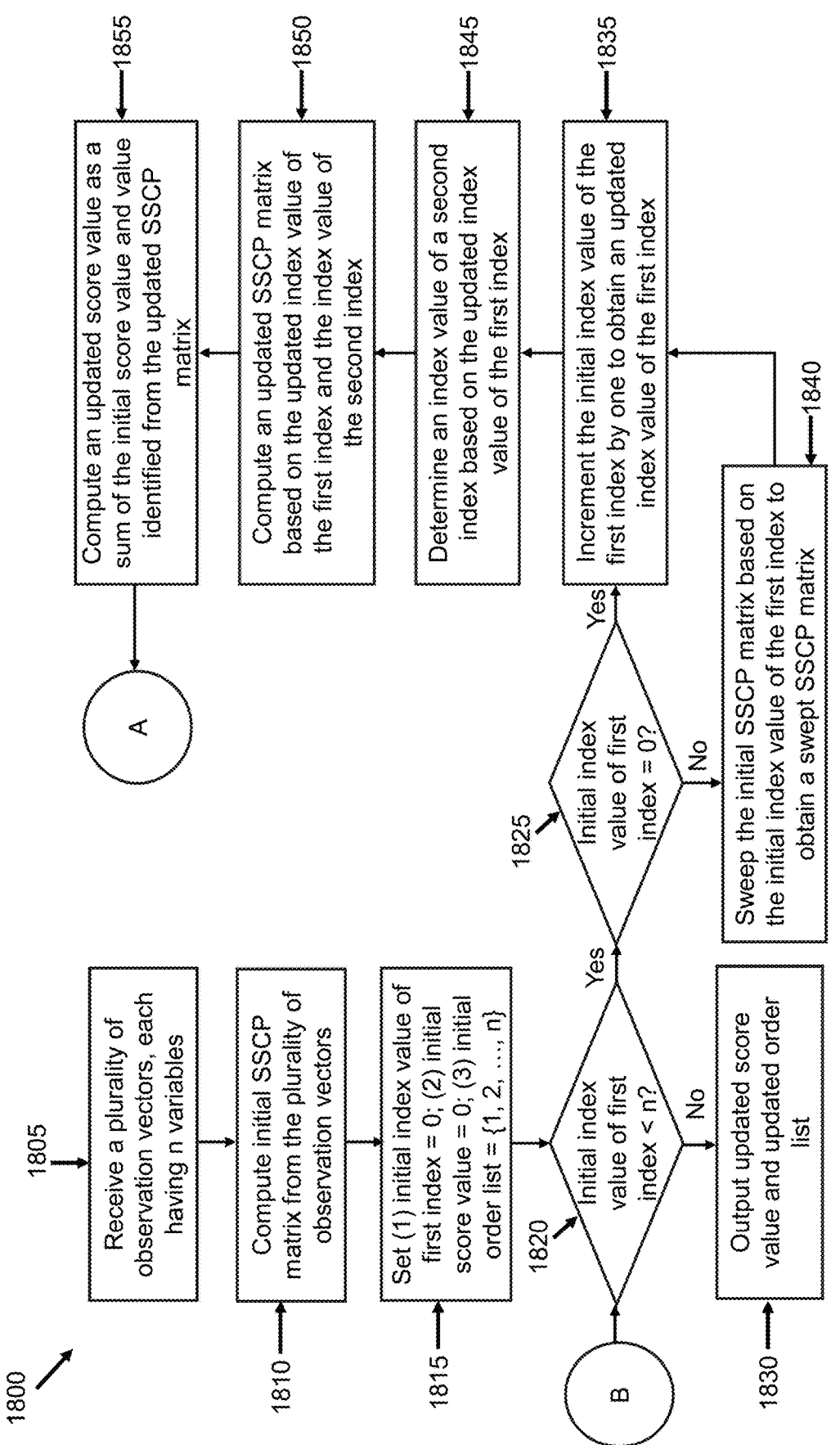
FIG. 18 illustrates a flowchart showing an example process for determining a topological order for a DAG, according to embodiments of the present technology.

Turning now to FIG. 18, an example flowchart outlining the operations of a process 1800 is shown, in accordance with some embodiments of the preset disclosure. The process 1800 may be used to determine the topological order 1720 of a DAG (e.g., the DAG 1500). The process 1800 may be executed by one or more processors (e.g., the processor 1430) associated with the DAG learning application 1435. In particular, one or more processors may execute computer-readable instructions (e.g., the DAG learning computer-readable instructions 1445) to determine the topological order 1720 of the DAG. The process 1800 may include other or additional operations depending upon the embodiment.

The determination of the topological order 1720 of a DAG as described herein is based on a Minimum Conditional Variance (MCV) assumption. A "conditional variance" refers to the variation of a variable given the values of one or more other variables. Through thousands of trials, the inventors have found that the assumption holds for determining the correct topological order. The assumption indicates that the topological order 1720 of a DAG corresponds to a best score that is determined based on conditional variances computed from the observation vectors. In other words, the assumption may be mathematically represented as follows:

A topological order $\{O_1, O_2, \ldots, O_n\}$ where n is the number of variables corresponds to the best score if:

$$\forall i \in [1,n), \forall j>i, \mathrm{var}(x_{o_i}|x_{o_1}, \quad . \quad . \quad . \quad , \quad x_{o_{i-1}}) \leq \mathrm{var}(x_{o_j}$$
$$|x_{o_1}, \ldots, x_{o_{i-1}}) \qquad\qquad \text{Equation 2}$$

Plainly speaking, Equation 2 means that for every i that belongs to the set [1, n), and for every j that is greater than i, the variance of $x_{o_i}$ which is conditional on $x_{o_1}, \ldots, x_{o_{i-1}}$ is less than or equal to the variance of $x_{o_j}$ which is also conditional on $x_{o_1}, \ldots, x_{o_{i-1}}$. $x_{o_i}$ and $x_{o_j}$ are variable values in an observation vector having indices $O_i$ and $O_j$. A score, e.g., the mean squared error, or likelihood, or entropy, may be evaluated for each given topological order. According to the assumption, the score reaches its optimum when Equation 2 is satisfied and the corresponding order of variables when Equation 2 is satisfied constitutes the topological order of the DAG. In some embodiments, the conditional variances of $x_{o_i}$ and $x_{o_j}$ may be computed using a SWEEP operator, explained in more detail below.

Referring specifically to the process 1800, the one or more processors may cause presentation of one or more user interface windows, which may include one or more menus and/or selectors such as drop-down menus, buttons, text boxes, hyperlinks, etc. associated with the DAG learning application 1435. The one or more menus and/or selectors may be accessed in various orders. An indicator may indicate one or more user selections from such one or more user interface windows, one or more data entries into a data field of the one or more user interface windows, one or more data items read from a command line, one or more data items read from a computer-readable medium (e.g., the computer-readable medium 1410), and/or one or more data items otherwise defined with one or more default values, etc. that are received as an input by DAG learning application 1435. Some of the operations of the process 1800 may be performed in parallel, for example, using a plurality of threads and/or a plurality of computing devices.

The process 1800 may, thus, include receiving, by one or more processors, a first indicator identifying a name and location of where the DAG input data 1450 is stored. The one or more processors may also receive a second indicator identifying the plurality of variables and their associated data values (e.g., observation vectors) to use for the process 1800. The one or more processors retrieves the variables and their associated data values identified in the second indicator from the location/name identified in the first indicator at operation 1805. Also, at the operation 1805, the one or more processors may sequentially assign each of the plurality of variables a unique index, k from k 1, . . . , n.

Thus, at the operation 1805, the processor receives input data (e.g., the DAG input data 1450) having a plurality of observation vectors (e.g., 10000 observation vectors) with each observation vector having values for a plurality of variables. The plurality of observation vectors may be arranged in the form of a matrix, as discussed above, having n (e.g., number of variables) columns and N (e.g., number of observation vectors) rows. In sonic embodiments, variables having the same index may be arranged in the same column of the matrix. For example, if the input data includes 3 observation vectors (again, any example used herein is not intended to be limiting and only used for explanation purposes) and each observation vector includes 4 variables (V1, V2, V3, V4), V1 may be column 1 in the matrix, V2 may be column 2, V3 may be column 3, and V4 may be column 4 of the matrix, and the associated values for each observation vector may be provided in that column, Row 1 of the matrix may correspond to the first observation vector, row 2 may correspond to the second observation vector, and row 3 may correspond to the third observation vector, Thus, each of the plurality of observation vectors includes variable values of a plurality of variables, and a number of the plurality of variables in each of the plurality of observation vectors is n.

At operation 1810, the processor computes an initial sum of squares and cross products (SSCP) matrix from variable values of the plurality of observation vectors of the operation 1805. An SSCP matrix may be computed from values defined for each observation vector for each variable of the plurality of variables using SSCP=$X^TX$, where X is an input matrix having dimension N×n and defined based on X=$x_{i,j}$, i=1, . . . , N; j=1, . . . , n, where the $x_{i,j}$ are defined from the input data of the operation 1805, T indicates a transpose, and the SSCP matrix has a dimension n×n. More particularly, the SSCP matrix may be defined as:

$$X^TX = \begin{bmatrix} \Sigma X_1^2 & \Sigma X_1 X_2 & \dots & \Sigma X_1 Xn \\ \Sigma X_2 X_1 & \Sigma X_2^2 & \dots & \Sigma X_2 Xn \\ \dots & \dots & \dots & \dots \\ \Sigma X_N X_1 & \Sigma Xn X_2 & \dots & \Sigma Xn^2 \end{bmatrix} \quad \text{Equation 3}$$

In Equation 3 above, $$\sum X_i^2$$

is the sum of the squares of all elements in column i of matrix X and $\Sigma X_i X_j$ is the sum of cross products produced by multiplying each element in column i of matrix X with the corresponding element from column j and summing the result.

Computation of the SSCP matrix may be performed in parallel using a plurality of threads and/or computing devices, for example, as described in U.S. Pat. No. 8,996,518 that issued Mar. 31, 2015, to SAS Institute Inc. Thus, at the operation 1810, the one or more processors computes an SSCP matrix for the input data of the operation 1805.

At operation 1815, the processor sets an initial index value of a first index to be zero; an initial score value of a score to be zero; and an initial order list for the plurality of variables. The first index, i may be an index between 0 and n (e.g., the number of variables). In other words, the process 1800 may be repeated n times to obtain the topological order 1720 of a DAG. At the operation 1815, the processor may also initialize the initial order list for the plurality of variables as {1, 2, . . . , n} where n is the number of variables. In some embodiments, the initial order list may be based on the sequential unique index assigned by the one or more processors to each variable. For example, if the input data of the operation 1805 includes 100 variables (V1, V2, . . . , V100}, with each variable having a unique index between 1 and 100, the initial order list may be initialized as {1, 2, . . . 100} to correspond to the sequential order of the indices assigned to the variables. In other embodiments, another sequential order or a non-sequential order may be used for the initial order list.

At operation 1820, the processor compares the initial index value of the first index with n. In other words, the processor determines if i<n. Specifically, at the operation 1820, the processor determines whether the last iteration n is reached. If the last iteration is not reached, the process 1800 proceeds to operation 1825. Otherwise, if the processor determines that i=n at the operation 1820, the process 1800 proceeds to operation 1830 where the updated score value and the updated order list are output. The updated order list of the operation 1830 corresponds to the topological order 1720 of the DAG. The updated score value when i=n is the best score value since the updated order list of the operation 1830 satisfies Equation 2 above.

At the operation 1825, the processor determines if the initial index value of the first index is greater than zero. In other words, the processor determines if i>0. Thus, the processor determines whether the process 1800 is in the first iteration (i=0). If the processor determines that the process 1800 is in the first iteration (that is, i=0), the process proceeds to operation 1835 where the processor increments the initial index value of the first index in the current iteration by one to obtain an updated index value of the first index. For example, in the first iteration, the value of i is 0. Therefore, at the operation 1835, the processor sets the new value of i to be 0+1=1. In some embodiments, the first iteration is treated differently from the remaining iterations of the process 1800 because computation of conditional variances is not needed in the first iteration. As indicated above, the present disclosure uses a SWEEP operator to compute conditional variances. The SWEEP operator uses the values from the iteration immediately preceding the current iteration to compute the conditional variance values. For a first iteration, there are no previous values. Therefore, computing the conditional variances does not change the values of the variables. Accordingly, there is no need to compute the conditional variances in the first iteration.

However, if at the operation 1825, the processor determines that the initial index value of the first index greater than zero (e.g., i>0 (e.g., it is not the first iteration)), the process 1800 proceeds to operation 1840 where the process computes the conditional variances using a SWEEP operator. As indicated above, the SWEEP operator is executed on the values of the variables from the immediately preceding iteration. For example, in iteration 2, the values of the variables at the end of iteration 1 are used, in iteration 3, the values of the variables at the end of iteration 2 are used, and so on. In particular, at the end of each iteration, the SSCP matrix initially computed at the operation 1810 is updated with the new values of the variables. The updated SSCP is then used by the SWEEP operator in the next iteration to compute the conditional variances to generate a swept SSCP matrix having the computed conditional variance values.

A SWEEP operator may be used to compute the conditional variance values for all the variables in the SSCP matrix (or the updated SSCP matrix) in one "sweep" instead of computing the conditional variance of each variable one at a time, thereby conserving computational resources and increasing the speed of computation. In more detail, a SWEEP operator allows "sweeping in" or "sweeping out" particular rows of the initial SSCP matrix (e.g., in the first iteration) or the updated SSCP matrix (e.g., in subsequent iterations). By "sweeping in" or "sweeping out," the values for the conditional variances are updated simultaneously.

In particular, for a matrix X, the SWEEP operator SWEEP (X, i) modifies the initial SSCP matrix or the updated SSCP matrix based on the pivot element SSCP[i, i] and the i_th row as follows:

Let D=SSCP[i,i] be the i_th diagonal element.

Divide the i_th row by D.

For every other row n that is not equal to i, let Y=SSCP [n,i] be the n_th element of the i_th column.

Subtract Y×(row i) from row n.

Then set SSCP[n,i]=−Y/D.

Set SSCP[i,i]=1/D.

Additional details of the SWEEP operator may be found in James H. Goodnight, "A Tutorial on the SWEEP Operator" (August 1979) pp 149-158, the entirety of which is incorporated by reference herein.

The output of executing the SWEEP operator is a swept SSCP matrix. Responsive to generating the swept SSCP matrix at the operation 1840, the process 1800 proceeds to the operation 1835 where the value of the initial index value of the first index is incremented by one to obtain an updated index value of the first index (e.g., i is incremented by 1), as discussed above.

At operation 1845, the processor determines an index value of a second index, j, based on the updated index value of the first index from the operation 1835. In particular, the processor determines the index value of the second index, j, from the initial SSCP matrix if the initial index value of the first index at the operation 1825 is equal to zero (e.g., the first iteration) or the swept SSCP matrix if the initial index value at the operation 1825 is greater than zero (e.g., subsequent iterations). To determine the index value of the second index, the processor determines a smallest value from one or more diagonal elements in the initial SSCP matrix if the initial index value of the first index at the operation 1825 is equal to zero (e.g., the first iteration) or the swept SSCP matrix if the initial index value at the operation 1825 is greater than zero (e.g., subsequent iterations). The one or more diagonal elements are {i-th, (i+1)-th, . . . n-th}diagonal elements of the initial SSCP matrix or the swept SSCP matrix, where i is the updated index value of the first index determined at the operation 1835. In particular, to determine the value of the second index, j, the processor compares the values (e.g., the conditional variance values computed by the SWEEP operator) of the diagonal elements (e.g., [1,1], [2,2], [3,3], . . . , [n, n]) of the initial SSCP matrix or the swept SSCP matrix. The notation [1,1] means the first row and first column, [2,2] means the second row and second column, and so on. Based on the comparison of the diagonal elements, the processor selects the smallest value. The second index j is the row or column number corresponding to the smallest value. For example, if the smallest value of all the diagonal elements is in row 3 and column 3 (e.g., [3,3]), the value of the second index j=3.

At operation 1850, responsive to determining the value of the second index j, the processor computes an updated SSCP matrix based on the updated index value of the first index at the operation 1835 and the index value of the second index. The updated SSCP matrix is determined from the initial SSCP matrix if the initial index value of the first index at the operation 1825 is equal to zero (e.g., the first iteration) or the swept SSCP matrix if the initial index value at the operation 1825 is greater than zero (e.g., subsequent iterations). To compute the updated SSCP matrix, the processor exchanges row i with row j in the initial SSCP matrix if the initial index value of the first index at the operation 1825 is equal to zero (e.g., the first iteration) or the swept SSCP matrix if the initial index value at the operation 1825 is greater than zero (e.g., subsequent iterations). The processor also exchanges column i with column j in the initial SSCP matrix if the initial index value of the first index at the operation 1825 is equal to zero (e.g., the first iteration) or the swept SSCP matrix if the initial index value at the operation 1825 is greater than zero (e.g., subsequent iterations). i is the updated index value of the first index determined at the operation 1835 and j is the index value of the second index determined at the operation 1845.

In particular, because Equation 2 requires that for all i and j>i, the conditional variance of $x_{oi}$ be less than or equal to the variance of $x_{oj}$, and the operation 1845 determined j as having the smallest conditional variance value, to satisfy Equation 2, the row i and column i are exchanged with row j and column j, respectively. By virtue of swapping row i and column i with row j and column j, respectively, the initial SSCP matrix if the initial index value of the first index at the operation 1825 is equal to zero (e.g., the first iteration) or the swept SSCP matrix if the initial index value at the operation 1825 is greater than zero (e.g., subsequent iterations) is updated to obtain the updated SSCP matrix.

At operation 1855, the processor computes an updated score value as a sum of the initial score value and a value identified from the updated SSCP matrix. To determine the updated score value, the processor performs computations as follows:

$$\text{Updated Score} = \text{Initial score value} + \text{SSCP}[i,i] \qquad \text{Equation 4}$$

For example, when the updated index value of the first index from the operation 1835 i=1, the updated score value may be a sum of the initial score value (e.g., 0 set at the operation 1815) and the value SSCP[i,i] determined from the updated SSCP matrix of the operation 1850. In particular, the value SSCP[i,i] identified from the updated SSCP matrix to compute the updated score value corresponds to a diagonal element value found in the row of the updated SSCP matrix corresponding to the updated index value of the first index of the operation 1835 and the column of the updated SSCP matrix corresponding to the updated index value of the first index of the operation 1835.

At operation 1860, the processor computes an updated order list from the initial order list based on the updated index value of the first index of the operation 1835 and the index value of the second index of the operation 1845. To compute the updated order list, the processor exchanges a first variable of the plurality of variables in a position corresponding to the updated index value of the first index of the operation 1835 in the initial order list with a second variable of the plurality of variables in the position corresponding to the index value of the second index in the initial order list. Thus, the processor switches the i-th and the j-th elements in the initial order list to obtain the updated order list.

At operation 1865, the processor sets the updated index value of the first index of the operation 1835 as the initial index value of the first index of the operation 1815, the updated score value computed at the operation 1855 as the initial score value of the operation 1815, the updated SSCP matrix computed at the operation 1850 as the initial SSCP matrix of the operation 1810, and the updated order list computed at the operation 1860 as the initial order list of the operation 1815. The process 1800 then loops back to the operation 1820 and the computations are repeated using the values set as the initial values at the operation 1865.

At the end of the last iteration (e.g., when i=n after the operation 1835), the updated score value from the operation 1855 is output as the final score and the updated order list from the operation 1860 is output as the final order list at the operation 1830. The final order list constitutes the topological order 1720 of the DAG.

Figure 19A:
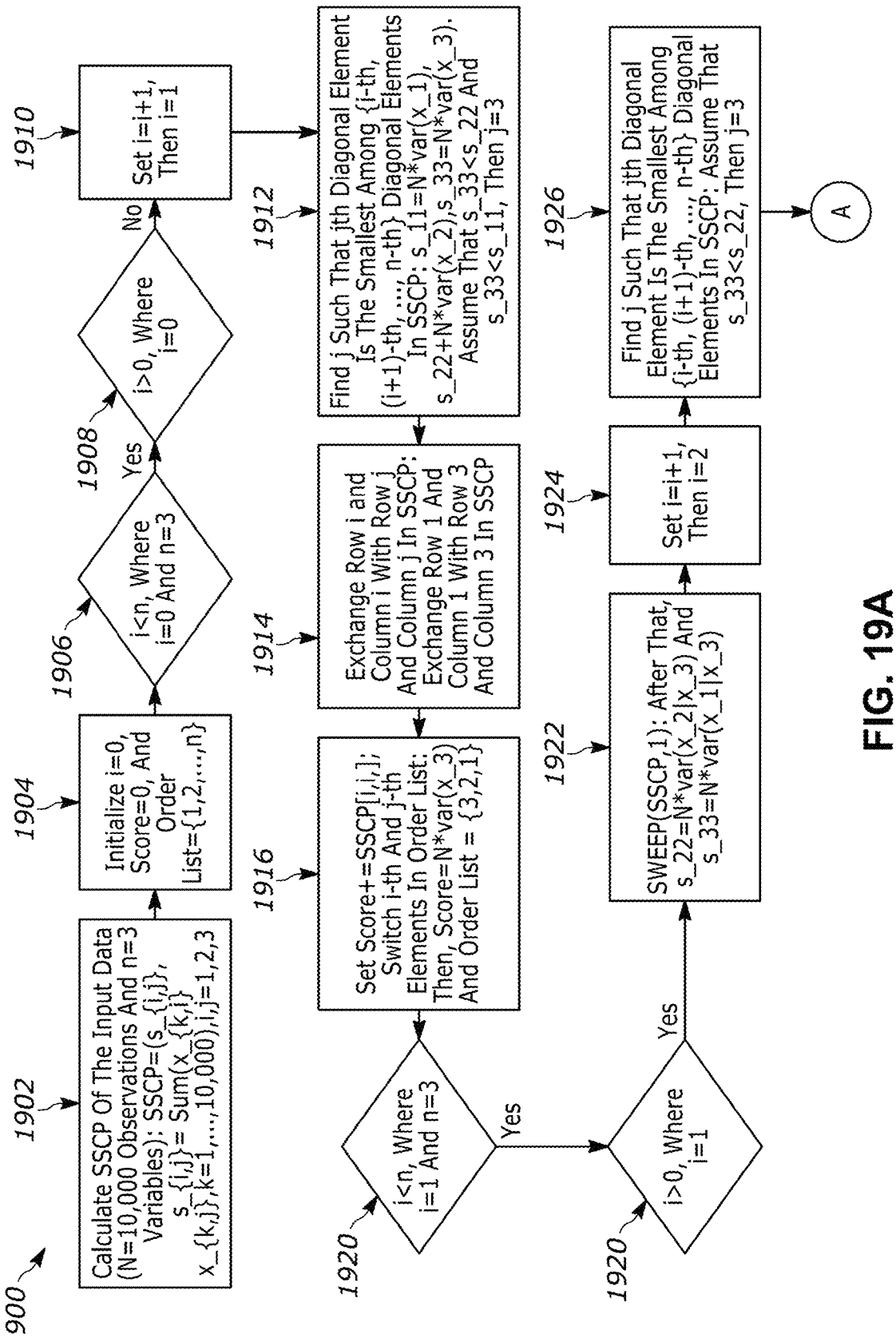
FIGS. 19A and 19B illustrate an example showing how the flowchart of FIG. 18 may be used for determining the topological order for a three variable data set, according to embodiments of the present technology.
Figure 19B:
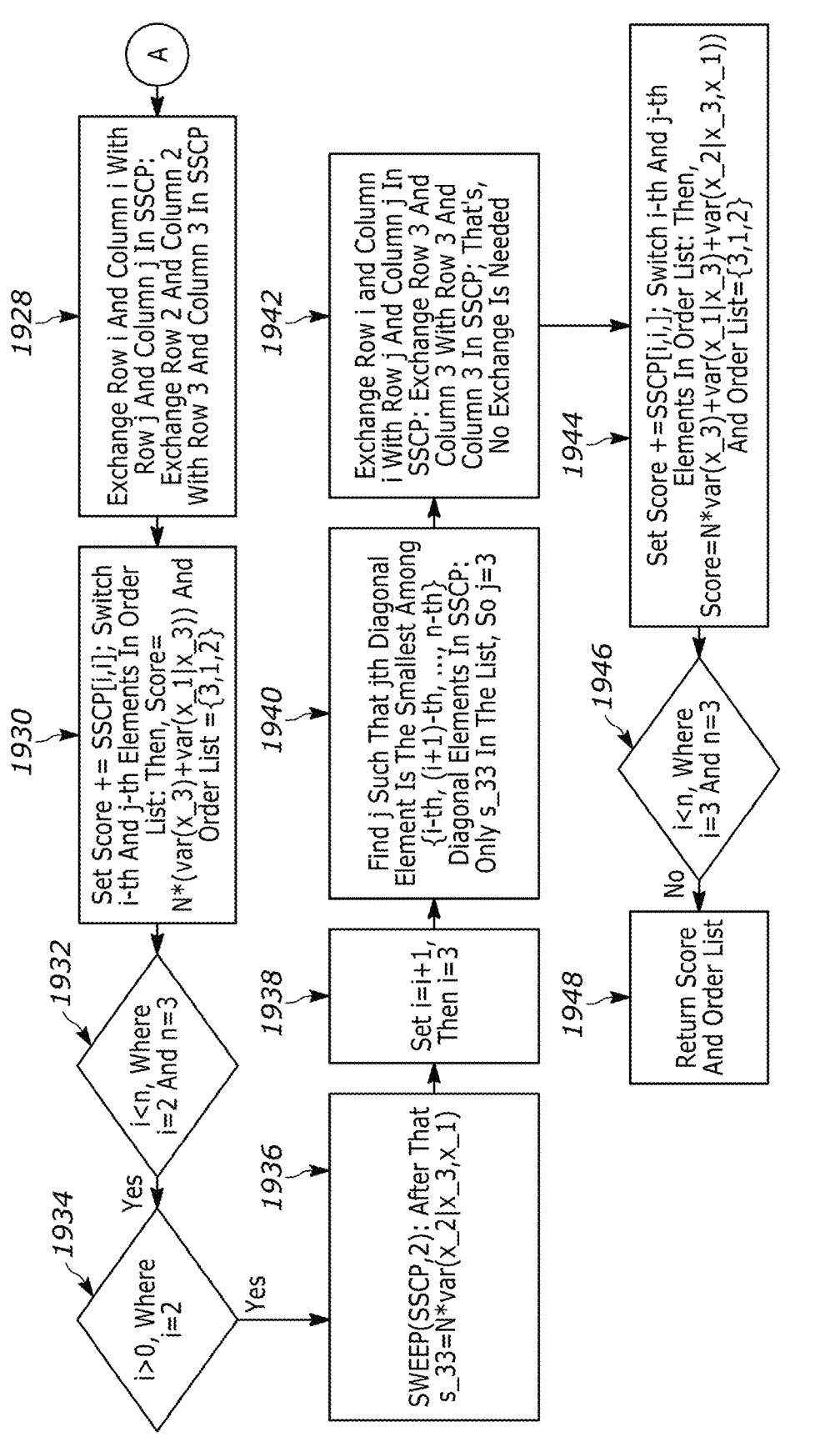

Turning now to FIGS. 19A and 19B, an example shows how the process 1800 may be applied, in accordance with some embodiments of the present disclosure. For explanation purposes only, the example of FIGS. 19A and 19B is based on input data having 10,000 observation vectors and 3 variables. Thus, the DAG input data 1430 for this example may include a matrix having 10,000 rows and 3 columns, with each row corresponding to one observation vector. Thus, the number of variables, n=3 and the number of observation vectors, N=10,000 in the example of FIGS. 19A and 19B. Because n=3, i=0, 1, 2, 3. In other words, the process 1800 has 2 iterations with a SWEEP operator computation and 1 iteration without the SWEEP operator computation. In total, for 3 variables, the process has n iterations. The first iteration includes operations 1902-1916. In the first iteration, at operation 1902, the processor computes the initial SSCP matrix from the DAG input data, as discussed above at the operation 1810. Either Equation 3 or the formula shown in FIG. 19A at the operation 1902 may be used for computing the initial SSCP matrix. The initial SSCP matrix may be an n×n matrix. Thus, since n=3, the initial SSCP matrix is a 3×3 matrix. At operation 1904, which corresponds to the operation 1815, the processor initializes the initial value of the first index i=0, the initial score value=0, and initial order list={1, 2, 3}. At the operation 1906, which corresponds to the operation 1820, the processor determines that i=0, which is less than 3 (n=3), so the process proceeds to the operation 1908 where the processor determines that the value of i=0. The operation 1908 corresponds to the operation 1825. At the operation 1910, which corresponds to the operation 1835, the processor increments the value of the first index, i by 1 (i=0+1). Thus, the updated index value of the first index i is now 1 at the operation 1910. No SWEEP operator needs to be applied to the initial SSCP matrix and each diagonal value in the initial SSCP matrix corresponds to a conditional variance value. At operation 1912, which corresponds to the operation 1845, the processor determines the lowest conditional variance value of the {i-th, (i+1)-th, . . . n-th} diagonal elements of the initial SSCP matrix. Specifically, the processor compares the corresponding conditional variance values at s_11 (row 1, column 1), s_22 (row 2 and column 2), and s_33 (row 3 and column 3).

Assuming the conditional variance value of s_11 is N*var(x_1), the conditional variance value of s_22 is N*var(x_2), and the conditional variance value of s_33 is N*var(x_3), and N*var(x_3) is less than N*var(x_2), and N*var(x_3) is less than N*var(x_1), then N*var(x_3) has the lowest conditional variance value of all the analyzed diagonal elements. Thus, the processor sets the index value of the second index, j to 3 (corresponding to the third row and third column where the lowest conditional variance value is found). Since s_ii, i=1, 2, 3, is proportional to var(x_i) by a constant factor N, s_ii may be considered the conditional variance value.

At the operation 1914, which corresponds to the operation 1850, the processor exchanges row 1 (corresponding to the updated index value of the first index, i) of the initial SSCP matrix with row 3 (corresponding to the index value of the second index, j) of the initial SSCP matrix, and exchanges column 1 (corresponding to the updated index value of the first index, i) of the initial SSCP matrix with column 3 (corresponding to the index value of the second index, j) of the initial SSCP matrix. Upon performing the exchange, an updated SSCP matrix is obtained. For example, upon performing the exchange, N*var(x_3), which before the exchange was in row 3 and column 3, is moved to row 1 and column 1.

At the operation 1916, which corresponds to the operations 1855, 1860, and 1865, the processor computes an updated order list in which the i-th and j-th variables from the initial order list of the operation 1904 are exchanged. Thus, for i=1 and j=3, the first and third variables in the initial order list are exchanged to obtain the updated order list of {3, 2, 1}. At the operation 1916, the processor also computes an updated score as a sum of the initial score of 0 from the operation 1904 and the conditional variance value at the location [i,i] of the updated SSCP matrix obtained at the end of the operation 1914. Because i=1, the processor determines that the conditional variance value in the first row and first column (e.g., SSCP[1,1]) is N*var(x_3). Thus, the updated score is set to N*var(x_3). Thus, at the end of the first iteration, i=1, score=N*var(x_3), and the updated order list={3, 2, 1}. The updated order list, the updated score value, the updated SSCP matrix, and the updated value of the first index are used as initial values in the second iteration.

The second iteration includes operations 1918-1930. At the operation 1918, the processor determines that i=1 (e.g., the updated value of the first index from the first iteration) which is less than n=3. The operation 1918 corresponds to the operation 1820. At the operation 1920, which corresponds to the operation 1825, the processor determines that i=1 is greater than 0. Therefore, the process 1900 proceeds to the operation 1922, which corresponds to the operation 1840. At the operation 1922, the processor applies a SWEEP operator on the updated SSCP matrix obtained at the output of the operation 1914 to obtain a swept SSCP matrix. At the operation 1924, the processor again increments the index value of the first index, i by summing the current index value of the first index i (1) with 1 to be 1+1 or 2. The operation 1924 corresponds to the operation 1835. At the operation 1926, which corresponds to the operation 1845, the processor determines the index value of the second index, j as the smallest diagonal element amongst the {i_th, (i+1)_th, . . . n_th}elements. Thus, because i=2, the processor compares the conditional variance values at SSCP[2,2] and SSCP[3,3]. Assuming the conditional variance value at SSCP[2,2] is s_22 (note the value s_22 in the second iteration may be different from the value s_22 in the first iteration) and the conditional variance value at SSCP[3,3] is s_33 (note the value s_33 in the second iteration may be different from the value s_33 in the first iteration), and that s_33 is less than s_22, the index value of the second index, j is again 3 (e.g., the third row and the third column where s_33 is found).

At the operation 1928, which corresponds to the operation 1850, the processor exchanges row 2 (since i=2) and column 2 with row 3 (since j=3) and column 3, respectively, of the swept SSCP matrix to obtain an updated SSCP matrix. At the operation 1930, which corresponds to the operations 1855, 1860, and 1865, the processor determines the updated order list and the updated score value. The processor may obtain the updated order list by swapping the second and third variables (since i=2 and j=3) in the updated order list obtained at the operation 1916. Thus, the updated order list is now {3, 1, 2}. The processor computes the updated score as the previous updated score value of N*var(x_3)+SSCP [2,2], which is equal to N*(var(x_3)+var(x_1|x_3)). The updated values are then set as the initial values for the next iteration. Thus, at the end of the second iteration, i=2, the initial score value=N*(var(x_3)+var(x_1|x_3)), and the initial order list={3, 1, 2}.

Operations 1932-1944 correspond to the third and final iteration. At the operation 1932, the processor determines that the initial value of the first index, i=2 which is less than n=3, so the process 1900 proceeds to the operation 1934 where the processor determines that i=2 is greater than 0 and the process proceeds to the operation 1936. The operations 1932, 1934, 1936 correspond to the operations 1820, 1825, and 1840, respectively. At the operation 1936, the processor computes a SWEEP (SSCP, 2) operation after which s_33 (e.g., the conditional variance value at the third row and third column) of the swept SSCP matrix is N*var(x_2|x_3, x_1). At the operation 1938, which corresponds to the operation 1835, the processor increments the index value of the first index, i=2 by 1 to obtain the updated index value for the first index, i=3. At the operation 1940, the processor finds the index value of second index j. In particular, the processor analyzes the {i-th, (i+1)-th, . . . n-th} diagonal elements of the SSCP matrix generated at the operation 1936. The processor identifies the smallest value of those diagonal elements. Because i=3 and n=3, the only element for the processor to analyze is the value at s_33 (row 3, column 3). Thus, the processor assigns the value of j=3. The operation 1940 corresponds to the operation 1845.

At the operation 1942, the processor exchanges the row i with the row j and column i with the column j of the swept SSCP matrix generated at the operation 1936. Because i=j=3, the exchange does not change the values. Therefore, in essence, no exchange of values is needed when i=j. The operation 1942 corresponds with the operation 1850. At the operation 1944, the processor computes an updated score value based on the score computed at the operation 1930. For example, the processor may compute that the current score is a sum of the previous score from the operation 1930 and the value at SSCP[i,i], which is s_33. Thus, the current score becomes N*(var(x_3)+var(x_1|x_3)+var(x_21x_3, x_1)). At the operation 1944, the processor also computes the updated order list by swapping the i-th and j-th elements in the order list generated at the operation 1930. Because i=j=3, the swapping results in the same value. Essentially, when i=j, no swapping is needed. The operation 1944 corresponds to the operations 1855, 1860, and 1865. Thus, at the end of the third iteration, i=3, score value=N*(var (x_3)+var(x_1|x_3)+var(x_21x_3, x_1)), and the order list={3, 1, 2}.

At operation 1946, which corresponds to the operation 1820, the processor determines that the value of i is not less than the value of n. In other words, because i=n=3 at this point, the process 1900 returns the score and the order list from the operation 1944. This order list corresponds to the topological order of the DAG. The operation 1948 corresponds to the operation 1830.

The proposed approach discussed herein learns an accurate topological order of a DAG at increased speed while consuming significantly less computational resources compared to a conventional approach. In particular, the inventors compared the proposed approach with a Topological Order Permutation (TOP) mechanism discussed in the U.S. Pat. No. 11,443,198 mentioned above. The TOP mechanism provides a neighboring search-based mechanism to find the topological order. The inventors found that the accuracy of the topological order determined by the TOP mechanism and the proposed approach reaches 100%. In other words, the SHD for both approaches is zero. However, as the number of variables increases, the accuracy of the proposed approach becomes greater than the accuracy of the TOP mechanism (e.g., the SHD of the TOP mechanism becomes non-zero). The time cost of computing the topological order using the TOP mechanism is a polynomial function of $O(N^6)$, where N is the number of variables. The time cost of computing the topological order using the proposed approach is $O(N^3)$. Therefore, the proposed approach is faster than the TOP mechanism. In addition, when parallel processing (e.g., MPP mode) is used in the TOP mechanism, the inventors found that the time cost of the TOP mechanism decreases to $O(N^4 [N^2/C])$, where C is the number of cores (e.g., CPUs) in the MPP mode, but is still higher than the time cost of the proposed approach which remains at $O(N^3)$.

Thus, the proposed approach may be executed using an SMP mode, which requires fewer computational resources, while still offering a substantial speedup in time needed to learn the topological order relative to the TOP mechanism. The Big O notation in $O(N^6)$, $O(N^3)$, and $O(N^4 [N^2/C])$ may be used to describe the complexity of an algorithm. In other words, the big O notation may indicate how long an algorithm may take to complete and generate a result (e.g., the topological order) given the size of the input (e.g., the number of variables). For example, $O(N^3)$ may indicate that the time cost at which the proposed approach determines the topological order of a DAG is directly proportional to $N^3$ seconds.

The inventors executed 100 trials for each set of {N, M} where N is the number of variables and M is the number of edges in the DAG. Each trial included either 20, 40, 60, 80, and 100 variables. Therefore, inventors executed 100 trials with 20 variables, 100 trials with 40 variables, 100 trials with 60 variables, 100 trials with 80 variables, and 100 trials with 100 variables. Thus, in total, the inventors executed 500 trials. For each trial, the number of edges was set to 6N. Each trial was run both using the proposed approach and using the TOP mechanism. Each trial included a randomly generated set of 10,000 observation vectors. The results of these trials are summarized below.

The trials compared the accuracy of the proposed approach with the accuracy of the TOP mechanism. The inventors found that over the 500 trials, the proposed approach has a 100% accuracy (e.g., the SHD=0) for almost all trials, as shown in Table 4 below:

TABLE 4

| # Variables (N) | # Edges (6N) | Type | SHD | # Missing Edges | # Extra Edges | # Reverse Edges | True Positive Rate |
|---|---|---|---|---|---|---|---|
| 20 | 120 | Mean | 0 | 0 | 0 | 0 | 100% |
| | | Std. Dev. | 0 | 0 | 0 | 0 | 0 |
| 40 | 240 | Mean | 0 | 0 | 0 | 0 | 100% |
| | | Std. Dev. | 0 | 0 | 0 | 0 | 0 |
| 60 | 360 | Mean | 0 | 0 | 0 | 0 | 100% |
| | | Std. Dev. | 0 | 0 | 0 | 0 | 0 |
| 80 | 480 | Mean | 0 | 0 | 0 | 0 | 100% |
| | | Std. Dev. | 0 | 0 | 0 | 0 | 0 |
| 100 | 600 | Mean | 0.010 (0.030) | 0 | 0.010 (0.030) | 0 | 100% |
| | | Std. Dev. | 0.010 (0.017) | 0 | 0.010 (0.017) | 0 | 0 |

The values in Table 4 above correspond to both the TOP mechanism and the proposed approach. For each set of 100 trials with a given number of variables, the inventors computed the mean and standard deviation of SHD. Table 4 also shows the number of missing edges, reverse edges, and extra edges that were found in each set of 100 trials. The true positive rate indicates the number of edges that were correctly identified. For the trials associated with 100 variables, the mean SHD for the proposed approach is 0.010, which means that out of the 100 trials, 99 trials had an SHD=0, while one trial had one edge error (e.g., SHD not equal to zero). In comparison, for the same trials with the TOP mechanism, the values of the TOP mechanism are shown in parenthesis, which show a mean SHD of 0.030, indicating that out of the 100 trials for the 100-variable scenario, the TOP mechanism had an SHD=0 for 97 trials and 3 trials with edge errors (e.g., SHD not equal to zero). Thus, the proposed approach is either as accurate as the TOP mechanism or more accurate than the TOP mechanism.

Tables 5 and 6 below provide a speed comparison between the proposed approach and the TOP mechanism:

TABLE 5

| # Var | # Edge | Type | New | TOP | Speedup |
|---|---|---|---|---|---|
| 20 | 120 | Mean | 0.048 | 0.074 | 1.543 |
| | | SD | 0.005 | 0.001 | |
| 40 | 240 | Mean | 0.041 | 1.747 | 42.89 |
| | | SD | 0.002 | 0.014 | |
| 60 | 360 | Mean | 0.051 | 16.91 | 333.5 |
| | | SD | 0.001 | 0.137 | |
| 80 | 480 | Mean | 0.052 | 85.30 | 1631 |
| | | SD | 0.001 | 0.543 | |
| 100 | 600 | Mean | 0.053 | 280.0 | 5299 |
| | | SD | 0.001 | 2.677 | |

TABLE 6

| # Var | # Edge | Type | New | TOP | Speedup |
|---|---|---|---|---|---|
| 20 | 120 | Mean | 0.763 | 0.904 | 1.185 |
| | | SD | 0.023 | 0.021 | |
| 40 | 240 | Mean | 0.808 | 1.171 | 1.450 |
| | | SD | 0.027 | 0.021 | |

TABLE 6-continued

| # Var | # Edge | Type | New | TOP | Speedup |
|---|---|---|---|---|---|
| 60 | 360 | Mean | 0.861 | 1.185 | 1.375 |
| | | SD | 0.060 | 0.026 | |
| 80 | 480 | Mean | 0.855 | 2.808 | 3.283 |
| | | SD | 0.020 | 0.083 | |
| 100 | 600 | Mean | 0.894 | 3.372 | 3.770 |
| | | SD | 0.020 | 0.042 | |

Table 5 above compares the performance of the proposed approach with the TOP mechanism in an SMP mode having 1 CPU, while Table 6 above compares the performance of the proposed approach with the TOP mechanism in an MPP mode having 2,000 CPU cores. The column labeled "New" in both Tables 5 and 6 corresponds to the results of the proposed approach and the column labeled "TOP" in both Tables 5 and 6 corresponds to the results of the TOP mechanism. Again, for each set of 100 trials, the inventors computed the mean and standard deviation for the amount of time in seconds taken to compute the topological order by both the proposed approach and the TOP mechanism. The column "speedup" in both Tables 5 and 6 indicates how many times the proposed approach is faster than the TOP mechanism, the quotient of column "TOP" value and column "New" value at the same row with the column "Type" value as "Mean". Table 5 shows that for all the trials, the proposed approach is faster than the TOP mechanism. Table 5 further shows that as the number of variables increases, the speedup offered by the proposed approach increases significantly compared to the TOP mechanism. With the 1 CPU in SMP mode, the proposed approach learns the topological order of the DAG in a time period proportional to $N^3$ seconds (e.g., $O(N^3)$) in Table 5, while the TOP mechanism learns the topological order in a time period proportional to $N^6$ seconds (e.g., $O(N^6)$) in Table 5. Thus, without parallelization, the proposed approach is faster than the TOP mechanism.

Table 6 shows the speedup with parallelization. Similar to Table 5, Table 6 also shows that the proposed approach is faster than the TOP mechanism across the board. While the TOP mechanism is faster in Table 6 compared to Table 5, that speed is still less than the proposed approach. Table 6 indicates that the TOP mechanism is sped up by parallelization. However, parallelization does not impact, and in fact decreases, the speed of the proposed approach in Table 6 relative to Table 5. For example, the values of the time in Table 5 in the column "New" are lower than the corresponding values in Table 6, indicating that the learning of the DAG occurred faster in the SMP mode than in the MPP mode. The decrease in the speed of the proposed approach in Table 6 may be attributed to the fixed computational cost associated with the 2000 CPUs (as opposed to the fixed computational cost associated with the 1 CPU in the SMP mode). Overall, the proposed approach learns the topological order of the DAG in a time period proportional to $N^3$ seconds (e.g., $O(N^3)$) in Table 6, while the TOP mechanism learns the topological order in a time period proportional to $N^4$ [$N^2/C$] seconds (e.g., $O(N^4$ [$N^2/C$]) in Table 6. Thus, even for a parallelization environment, the proposed approach is faster.

The inventors also performed trials to test the accuracy and speed offered by the proposed approach for a significantly larger number of variables. Specifically, the inventors performed 100 trials, with each trial having 1000 variables (N), 6000 edges (6N), and 10,000 randomly generated observation vectors. The inventors ran 100 trials with 1 CPU in the SMP mode and 100 trials with 2000 CPUs in the MPP mode. Inventors found that the TOP algorithm for the same trials above and even with the 2000 CPUs in the MPP mode required about 50 days to learn the topological order. However, the proposed approach accurately learned the topological order of the DAG in significantly less time (e.g., a matter of seconds). Table 7 below shows the accuracy of the proposed approach in the above trials for both the SMP and MPP modes:

TABLE 7

| # Variables | # Edges | Type | SHD | # Missing Edges | # Extra Edges | # Reverse Edges | True Positive Rate |
|---|---|---|---|---|---|---|---|
| 1000 | 6000 | Mean | 0.490 | 0 | 0.490 | 0 | 100% |
| | | Std. Dev. | 0.066 | 0 | 0.066 | 0 | 0 |

Table 7 shows that even for the 1000 variables, the proposed approach provides a high accuracy. Of the 100 trials for each of SMP and MPP, the SHD of 0.490 indicates that out of 6000 edges in each trial, total 49 edge errors were found, which is still a significantly high accuracy rate.

Table 8 shows the speed for both SMP and MPP modes for the proposed approach:

TABLE 8

| # Var | # Edge | Type | SMP | MPP |
|---|---|---|---|---|
| 1000 | 6000 | Mean | 2.137 | 4.774 |
| | | SD | 0.012 | 0.044 |

Table 8 shows that the proposed approach learns the DAG in just over 2 seconds for the SMP mode and around 5 seconds in the MPP mode—which is considerably less than the approximate 50 days required by the TOP mechanism. Thus, the proposed approach is easily scalable to a large number of variables without requiring any significant additional computing resources.

Table 9 below provides another comparative example showing the speed and computing resources needed to reach 100% accuracy in learning a DAG having 100 variables:

TABLE 9

| | Before TOP mechanism | TOP mechanism (U.S. Pat. No. 11,443,198) | Proposed Approach |
|---|---|---|---|
| Speed/Computing Resources | $10^{3000}$ CPU years | 2 CPU hours | 1 CPU second |
| Power Consumption | $1.3 * 10^{3006}$ watts | 300 watts | 0.042 watts |
| Economic Cost | US$ $2.0 * 10^{3004}$ | US$ 4.5 | US$ 0.0006 |

Thus, Table 9 shows that the TOP mechanism requires 2 CPU hours to learn a DAG having 100 variables accurately. In contrast, the proposed approach only requires 1 CPU second. CPU hours refer to the amount of time a CPU (Central Processing Unit) spends executing instructions for a computer application. Thus, the TOP mechanism requires 2 hours of CPU time to correctly learn a DAG for 100 variables, while the proposed approach only requires 1 second of CPU time. By drastically reducing the CPU time, the proposed approach also offers significant power consumption savings. In particular, the longer a computing unit (e.g., CPU) operates, the more power that computing unit consumes. The TOP mechanism consumes 300 watts of power to accurately learn a DAG having 100 variables. In contrast, the proposed approach only consumes 0.042 watts, providing an 99.986% savings in power consumption. As the number of variables increases in the DAG, the amount of power consumption savings also increases.

Lower power consumption means less that the CPU generates less heat, which may lead to an overall cooler computing unit, thereby maintaining optimal computing performance and reducing the need for extensive external and internal cooling systems. With lower heat output, cooling fans may not need to work as hard or as long, thereby resulting in a quieter computing environment. Lower power consumption may also increase battery life in portable computing units that may be used for the proposed approach. Lower heat output may mean lower operating temperatures of the CPU to reduce normal wear and tear of the CPU, thereby potentially expanding the lifespan of the computing unit. Thus, the proposed approach not only provides technical software improvements in DAG learning techniques, the proposed approach also provides technical hardware improvements to the computing unit itself.

EXAMPLES

Example 1. A non-transitory computer-readable medium having computer-readable instructions stored thereon that when executed by a processor cause the processor to: compute an initial sum of squares and cross products (SSCP) matrix from variable values of a plurality of observation vectors, wherein each of the plurality of observation vectors comprises the variable values of a plurality of variables, and wherein a number of the plurality of variables in each of the plurality of observation vectors is n; set an initial index value of a first index to be zero; set an initial score value of a score to be zero; set an initial order list for the plurality of variables; and learn a topological order of a directed acyclic graph (DAG) by: (A) comparing the initial index value of the first index with n; (B) responsive to determining that the initial index value of the first index in (A) is less than n, executing (C) or responsive to determining that the initial index value of the first index in (A) is greater than or equal to n, executing (L); (C) responsive to determining that the initial index value of the first index in (A) is equal to zero, executing (E) through (K) or responsive to determining that the initial index value in (A) is greater than zero, executing (D) through (K); (D) sweeping the initial SSCP matrix based on the initial index value of the first index in (A) to obtain a swept SSCP matrix; (E) incrementing the initial index value of the first index in (A) by one to obtain an updated index value of the first index; (F) determining an index value of a second index based on the updated index value of the first index in (E), wherein the index value of the second index is determined from the initial SSCP matrix if the initial index value of the first index in (A) is equal to zero or the swept SSCP matrix if the initial index value in (A) is greater than zero; (G) computing an updated SSCP matrix based on the updated index value of the first index in (E) and the index value of the second index, wherein the updated SSCP matrix is determined from the initial SSCP matrix if the initial index value of the first index in (A) is equal to zero or the swept SSCP matrix if the initial index value in (A) is greater than zero; (H) computing an updated score value as a sum of the initial score value and a value identified from the updated SSCP matrix; (I) computing an updated order list from the initial order list based on the updated index value of the first index in (E) and the index value of the second index; (J) setting the updated index value of the first index in (E) as the initial index value of the first index in (A), the updated score value as the initial score value, the updated SSCP matrix as the initial SSCP matrix, and the updated order list as the initial order list; (K) repeating (A) through (J); and (L) outputting the updated score value from (H) and the updated order list from (I), wherein the updated order list corresponds to the topological order of the DAG.

Example 2. The non-transitory computer-readable medium of Example 1, wherein to determine the index value of the second index, the computer-readable instructions further cause the processor to determine a smallest value from one or more diagonal elements in the initial SSCP matrix if the initial index value of the first index in (A) is equal to zero or the swept SSCP matrix if the initial index value in (A) is greater than zero, wherein the one or more diagonal elements are {i-th, (i+1)-th, . . . n-th} elements of the initial SSCP matrix or the swept SSCP matrix, and wherein i is the updated index value of the first index in (E).

Example 3. The non-transitory computer-readable medium of Example 1, wherein to compute the updated SSCP matrix, the computer-readable instructions further cause the processor to: exchange row i with row j in the initial SSCP matrix if the initial index value of the first index in (A) is equal to zero or the swept SSCP matrix if the initial index value in (A) is greater than zero; and exchange column i with column j in the initial SSCP matrix if the initial index value of the first index in (A) is equal to zero or the swept SSCP matrix if the initial index value in (A) is greater than zero, wherein i is the updated index value of the first index in (E); and wherein j is the index value of the second index.

Example 4. The non-transitory computer-readable medium of Example 1, wherein the value identified from the updated SSCP matrix to compute the updated score value corresponds to a diagonal element value in a row of the updated SSCP matrix corresponding to the updated index value of the first index in (E) and a column of the updated SSCP matrix corresponding to the updated index value of the first index in (E).

Example 5. The non-transitory computer-readable medium of Example 1, wherein to compute the updated order list, the computer-readable instructions further cause the processor to exchange a first element in a position corresponding to the updated index value of the first index in (E) in the initial order list with a second element in the position corresponding to the index value of the second index in the initial order list.

Example 6. The non-transitory computer-readable medium of Example 1, wherein to compute the initial SSCP matrix, the computer-readable instructions further cause the processor to compute $X^\tau X$, where X is an input matrix comprising the plurality of observation vectors and $X^\tau$ is a transpose of the input matrix, and wherein the SSCP matrix has a dimension n×n.

Example 7. The non-transitory computer-readable medium of Example 1, wherein the processor learns the topological order of the DAG in a time period proportional to $n^3$ seconds.

Example 8. The non-transitory computer-readable medium of Example 7, wherein the processor is part of a symmetric multi-processing system having a single central processing unit.

Example 9. The non-transitory computer-readable medium of Example 1, wherein the computer-readable instructions further cause the processor to: determine a correct set of edges for the DAG; and generate the DAG based on the topological order of the DAG and the correct set of edges.

Example 10. The non-transitory computer-readable medium of Example 9, wherein the generated DAG is used for causal estimation to determine one or more relationships between one or more variables of the plurality of variables.

Example 11. A system comprising: a memory having computer-readable instructions stored thereon; and a processor that executes the computer-readable instructions to: compute an initial sum of squares and cross products (SSCP) matrix from variable values of a plurality of observation vectors, wherein each of the plurality of observation vectors comprises the variable values of a plurality of variables, and wherein a number of the plurality of variables in each of the plurality of observation vectors is n; set an initial index value of a first index to be zero; set an initial score value of a score to be zero; set an initial order list for the plurality of variables; and learn a topological order of a directed acyclic graph (DAG) by: (A) comparing the initial index value of the first index with n; (B) responsive to determining that the initial index value of the first index in (A) is less than n, executing (C) or responsive to determining that the initial index value of the first index in (A) is greater than or equal to n, executing (L); (C) responsive to determining that the initial index value of the first index in (A) is equal to zero, executing (E) through (K) or responsive to determining that the initial index value in (A) is greater than zero, executing (D) through (K); (D) sweeping the initial SSCP matrix based on the initial index value of the first index in (A) to obtain a swept SSCP matrix; (E) incrementing the initial index value of the first index in (A) by one to obtain an updated index value of the first index; (F) determining an index value of a second index based on the updated index value of the first index in (E), wherein the index value of the second index is determined from the initial SSCP matrix if the initial index value of the first index in (A) is equal to zero or the swept SSCP matrix if the initial index value in (A) is greater than zero; (G) computing an updated SSCP matrix based on the updated index value of the first index in (E) and the index value of the second index, wherein the updated SSCP matrix is determined from the initial SSCP matrix if the initial index value of the first index in (A) is equal to zero or the swept SSCP matrix if the initial index value in (A) is greater than zero; (H) computing an updated score value as a sum of the initial score value and a value identified from the updated SSCP matrix; (I) computing an updated order list from the initial order list based on the updated index value of the first index in (E) and the index value of the second index; (J) setting the updated index value of the first index in (E) as the initial index value of the first index in (A), the updated score value as the initial score value, the updated SSCP matrix as the initial SSCP matrix, and the updated order list as the initial order list; (K) repeating (A) through (J); and (L) outputting the updated score value from (H) and the updated order list from (I), wherein the updated order list corresponds to the topological order of the DAG.

Example 12. The system of Example 11, wherein to determine the index value of the second index, the computer-readable instructions further cause the processor to determine a smallest value from one or more diagonal elements in the initial SSCP matrix if the initial index value of the first index in (A) is equal to zero or the swept SSCP matrix if the initial index value in (A) is greater than zero, wherein the one or more diagonal elements are {i-th, (i+1)-th, . . . n-th} elements of the initial SSCP matrix or the swept SSCP matrix, and wherein i is the updated index value of the first index in (E).

Example 13. The system of Example 11, wherein to compute the updated SSCP matrix, the computer-readable instructions further cause the processor to: exchange row i with row j in the initial SSCP matrix if the initial index value of the first index in (A) is equal to zero or the swept SSCP matrix if the initial index value in (A) is greater than zero; and exchange column i with column j in the initial SSCP matrix if the initial index value of the first index in (A) is equal to zero or the swept SSCP matrix if the initial index value in (A) is greater than zero, wherein i is the updated index value of the first index in (E); and wherein j is the index value of the second index.

Example 14. The system of Example 11, wherein the value identified from the updated SSCP matrix to compute the updated score value corresponds to a diagonal element value in a row of the updated SSCP matrix corresponding to the updated index value of the first index in (E) and a column of the updated SSCP matrix corresponding to the updated index value of the first index in (E).

Example 15. The system of Example 11, wherein to compute the updated order list, the computer-readable instructions further cause the processor to exchange a first element in a position corresponding to the updated index value of the first index in (E) in the initial order list with a second element in the position corresponding to the index value of the second index in the initial order list.

Example 16. The system of Example 11, wherein to compute the initial SSCP matrix, the computer-readable instructions further cause the processor to compute $X^\tau X$, where X is an input matrix comprising the plurality of observation vectors and $X^\tau$ is a transpose of the input matrix, and wherein the SSCP matrix has a dimension n×n.

Example 17. The system of Example 11, wherein the processor learns the topological order of the DAG in a time period proportional to $n^3$ seconds.

Example 18. The system of Example 17, wherein the processor is part of a symmetric multi-processing system having a single central processing unit.

Example 19. The system of Example 11, wherein the computer-readable instructions further cause the processor to: determine a correct set of edges for the DAG; and generate the DAG based on the topological order of the DAG and the correct set of edges.

Example 20. The system of Example 19, wherein the generated DAG is used for causal estimation to determine one or more relationships between one or more variables of the plurality of variables.

Example 21. A method comprising: computing, by a processor executing computer-readable instructions stored on a memory, an initial sum of squares and cross products (SSCP) matrix from variable values of a plurality of observation vectors, wherein each of the plurality of observation vectors comprises the variable values of a plurality of variables, and wherein a number of the plurality of variables in each of the plurality of observation vectors is n; setting, by the processor, an initial index value of a first index to be zero; setting, by the processor, an initial score value of a score to be zero; setting, by the processor, an initial order list for the plurality of variables; and learning, by the processor, a topological order of a directed acyclic graph (DAG) by: (A) comparing, by the processor, the initial index value of the first index with n; (B) responsive to determining that the initial index value of the first index in (A) is less than n, executing, by the processor, (C) or responsive to determining that the initial index value of the first index in (A) is greater than or equal to n, executing, by the processor, (L); (C) responsive to determining that the initial index value of the first index in (A) is equal to zero, executing, by the processor, (E) through (K) or responsive to determining that the initial index value in (A) is greater than zero, executing, by the processor, (D) through (K); (D) sweeping, by the processor, the initial SSCP matrix based on the initial index value of the first index in (A) to obtain a swept SSCP matrix; (E) incrementing, by the processor, the initial index value of the first index in (A) by one to obtain an updated index value of the first index; (F) determining, by the processor, an index value of a second index based on the updated index value of the first index in (E), wherein the index value of the second index is determined from the initial SSCP matrix if the initial index value of the first index in (A) is equal to zero or the swept SSCP matrix if the initial index value in (A) is greater than zero; (G) computing, by the processor, an updated SSCP matrix based on the updated index value of the first index in (E) and the index value of the second index, wherein the updated SSCP matrix is determined from the initial SSCP matrix if the initial index value of the first index in (A) is equal to zero or the swept SSCP matrix if the initial index value in (A) is greater than zero; (H) computing, by the processor, an updated score value as a sum of the initial score value and a value identified from the updated SSCP matrix; (I) computing, by the processor, an updated order list from the initial order list based on the updated index value of the first index in (E) and the index value of the second index; (J) setting, by the processor, the updated index value of the first index in (E) as the initial index value of the first index in (A), the updated score value as the initial score value, the updated SSCP matrix as the initial SSCP matrix, and the updated order list as the initial order list; (K) repeating, by the processor, (A) through (J); and (L) outputting, by the processor, the updated score value from (H) and the updated order list from (I), wherein the updated order list corresponds to the topological order of the DAG.

Example 22. The method of Example 21, wherein to determine the index value of the second index, the method further comprises determining, by the processor, a smallest value from one or more diagonal elements in the initial SSCP matrix if the initial index value of the first index in (A) is equal to zero or the swept SSCP matrix if the initial index value in (A) is greater than zero, wherein the one or more diagonal elements are {i-th, (i+1)-th, . . . n-th}elements of the initial SSCP matrix or the swept SSCP matrix, and wherein i is the updated index value of the first index in (E).

Example 23. The method of Example 21, wherein to compute the updated SSCP matrix, the method further comprises: exchanging, by the processor, row i with row j in the initial SSCP matrix if the initial index value of the first index in (A) is equal to zero or the swept SSCP matrix if the initial index value in (A) is greater than zero; and exchanging, by the processor, column i with column j in the initial SSCP matrix if the initial index value of the first index in (A) is equal to zero or the swept SSCP matrix if the initial index value in (A) is greater than zero, wherein i is the updated index value of the first index in (E); and wherein j is the index value of the second index.

Example 24. The method of Example 21, wherein the value identified from the updated SSCP matrix to compute the updated score value corresponds to a diagonal element value in a row of the updated SSCP matrix corresponding to the updated index value of the first index in (E) and a column of the updated SSCP matrix corresponding to the updated index value of the first index in (E).

Example 25. The method of Example 21, wherein to compute the updated order list, the method further comprises exchanging, by the processor, a first element in a position corresponding to the updated index value of the first index in (E) in the initial order list with a second element in the position corresponding to the index value of the second index in the initial order list.

Example 26. The method of Example 21, wherein to compute the initial SSCP matrix, the method further comprises computing, by the processor, $X^\tau X$, where X is an input matrix comprising the plurality of observation vectors and $X^\tau$ is a transpose of the input matrix, and wherein the SSCP matrix has a dimension n×n.

Example 27. The method of Example 21, further comprising learning, by the processor, the topological order of the DAG in a time period proportional to $n^3$ seconds.

Example 28. The method of Example 27, wherein the processor is part of a symmetric multi-processing system having a single central processing unit.

Example 29. The method of Example 21, further comprising: determining, by the processor, a correct set of edges for the DAG; and generating, by the processor, the DAG based on the topological order of the DAG and the correct set of edges.

Example 30. The method of Example 29, further comprising using the generated DAG for causal estimation for determining one or more relationships between one or more variables of the plurality of variables.

The herein described subject matter illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents. The word "illustrative" is used herein to mean serving as an example, instance, or illustration. Any aspect or design described herein as "illustrative" is not necessarily to be construed as preferred or advantageous over other aspects or designs.

What is claimed is:

1. A non-transitory computer-readable medium having computer-readable instructions stored thereon for learning a causal structure from multivariate input data that when executed by a processing circuit causes the processing circuit to:

receive multivariate observation data from a plurality of data sources, the multivariate observation data comprising variable values associated with a plurality of variables;

initialize, by the processing circuit executing a graph-learning module stored in memory, a structural dependency model comprising a directed acyclic graph (DAG) template that defines potential causal relationships among the plurality of variables;

transform, by the processing circuit, the multivariate observation data into a structured dependency representation configured for causal structure analysis, wherein the structured dependency representation captures relationships among the plurality of variables for use in learning causal connections;

execute, by the processing circuit executing the graph-learning module, an iterative structure-learning operation to determine a topological order of the DAG based on the structured dependency representation, wherein each iteration dynamically updates:

(i) an index identifying a candidate variable for edge evaluation, (ii) a model evaluation score representing a causal consistency metric, and (iii) an ordered list of variables stored in the memory, and wherein the updates are applied through memory-level transformations of the structured dependency representation without exposing intermediate computation results externally;

detect convergence of the topological order when the model evaluation score satisfies a predefined accuracy criterion; and store the learned topological order in memory for implementation in subsequent causal inference operations that utilize the learned causal relationships of the DAG to perform predictive, discovery, estimation, or diagnostic computations.

2. The non-transitory computer-readable medium of claim 1, wherein:

the plurality of data sources comprises two or more network devices, and the topological order of the DAG is used to analyze the multivariate observation data and transform the multivariate observation data to output data.

3. The non-transitory computer-readable medium of claim 2, wherein the computer-readable instructions further cause the processing circuit to:

determine a correct set of edges for the DAG;

generate the DAG based on the topological order of the DAG and the correct set of edges; and analyze the multivariate observation data based on the DAG to generate the output data.

4. The non-transitory computer-readable medium of claim 2, wherein the multivariate observation data is based on input streaming or non-streaming data received from the one or more network devices.

5. A non-transitory computer-readable medium having computer-readable instructions stored thereon for accelerating a machine learning of a causal graph using a single processing circuit that when executed by a processor cause the processor to:

receive, by an analytical compute environment, multivariate observation data from a plurality of distributed data sources, wherein the observation data comprises variable values associated with a plurality of variables representing causal input parameters in a monitored system;

initialize, by the single processing circuit executing a graph-learning module, a structural dependency model for the monitored system, the structural dependency model comprising a directed acyclic graph (DAG) template stored in memory;

generate, by the single processing circuit, a correlation representation of the observation data by transforming the variable values into a computational structure configured for causal structure analysis;

execute, by the single processing circuit executing the graph-learning circuit, an iterative structure-learning operation to determine a topological order of the DAG based on the correlation representation, wherein each iteration dynamically updates:

(i) a dependency index identifying a next candidate node for edge determination, (ii) a model evaluation score representing a causal fit metric, and (iii) a variable order list stored in the memory, and wherein the dynamic updates are applied through memory-mapped transformations of the correlation representation without exposing intermediate computational results externally;

detect, by the analytical compute environment, convergence of the topological order based on the model evaluation score satisfying a predefined performance threshold;

deploy, by the analytical compute environment, the learned DAG model into a real-time causal inference pipeline that executes predictive operations for the monitored system based on the learned topological order; and update, by the analytical compute environment, internal configuration parameters associated with machine-learning components executed within the real-time causal inference pipeline based on updates to the learned DAG model, wherein the updated configuration parameters cause dynamic optimization of causal prediction operations.

6. The non-transitory computer-readable medium of claim 5, wherein:

the plurality of data sources comprises two or more network devices, and the topological order of the DAG is used to analyze the multivariate observation data and transform the multivariate observation data to output data.

7. The non-transitory computer-readable medium of claim 6, wherein the computer-readable instructions further cause the single processing circuit to:

determine a correct set of edges for the DAG;

generate the DAG based on the topological order of the DAG and the correct set of edges; and analyze the multivariate observation data based on the DAG to generate the output data.

8. The non-transitory computer-readable medium of claim 6, wherein the multivariate observation data is based on input streaming or non-streaming data received from the one or more network devices.

9. A method for learning a causal structure from multivariate input data comprising:

receiving multivariate observation data from a plurality of data sources, the multivariate observation data comprising variable values associated with a plurality of variables;

initializing, by processing circuit executing a graph-learning module stored in memory, a structural dependency model comprising a directed acyclic graph (DAG) template that defines potential causal relationships among the plurality of variables;

transforming, by the processing circuit, the multivariate observation data into a structured dependency representation configured for causal structure analysis, wherein the structured dependency representation captures relationships among the plurality of variables for use in learning causal connections;

executing, by the processing circuit executing the graph-learning module, an iterative structure-learning operation to determine a topological order of the DAG based on the structured dependency representation, wherein each iteration dynamically updates:
  (i) an index identifying a candidate variable for edge evaluation,
  (ii) a model evaluation score representing a causal consistency metric, and
  (iii) an ordered list of variables stored in the memory, and
wherein the updates are applied through memory-level transformations of the structured dependency representation without exposing intermediate computation results externally;

detecting convergence of the topological order when the model evaluation score satisfies a predefined accuracy criterion; and storing the learned topological order in memory for implementation in subsequent causal inference operations that utilize the learned causal relationships of the DAG to perform predictive, discovery, estimation, or diagnostic computations.

10. The method of claim 9, wherein:
the plurality of data sources comprises two or more network devices, and
the topological order of the DAG is used to analyze the multivariate observation data and transform the multivariate observation data to output data.

11. The method of claim 10, further comprising:
determining a correct set of edges for the DAG;
generating the DAG based on the topological order of the DAG and the correct set of edges; and
analyzing the multivariate observation data based on the DAG to generate the output data.

12. The method of claim 10, wherein the multivariate observation data is based on input streaming or non-streaming data received from the one or more network devices.

13. A method for learning a causal structure from multivariate input data comprising:
receiving, by an analytical compute environment, multivariate observation data from a plurality of distributed data sources, wherein the observation data comprises variable values associated with a plurality of variables representing causal input parameters in a monitored system;
initializing, by a single processing circuit executing a graph-learning module, a structural dependency model for the monitored system, the structural dependency model comprising a directed acyclic graph (DAG) template stored in memory;
generating, by the single processing circuit, a correlation representation of the observation data by transforming the variable values into a computational structure configured for causal structure analysis;
executing, by the single processing circuit executing the graph-learning circuit, an iterative structure-learning operation to determine a topological order of the DAG based on the correlation representation, wherein each iteration dynamically updates:
  (i) a dependency index identifying a next candidate node for edge determination,
  (ii) a model evaluation score representing a causal fit metric, and (iii) a variable order list stored in the memory, and
wherein the dynamic updates are applied through memory-mapped transformations of the correlation representation without exposing intermediate computational results externally;

detecting, by the analytical compute environment, convergence of the topological order based on the model evaluation score satisfying a predefined performance threshold;

deploying, by the analytical compute environment, the learned DAG model into a real-time causal inference pipeline that executes predictive operations for the monitored system based on the learned topological order; and updating, by the analytical compute environment, internal configuration parameters associated with machine-learning components executed within the real-time causal inference pipeline based on updates to the learned DAG model, wherein the updated configuration parameters cause dynamic optimization of causal prediction operations.

14. The method of claim 13, wherein:
the plurality of data sources comprises two or more network devices, and
the topological order of the DAG is used to analyze the multivariate observation data and transform the multivariate observation data to output data.

15. The method of claim 14, further comprising:
determining a correct set of edges for the DAG;
generating the DAG based on the topological order of the DAG and the correct set of edges; and
analyzing the multivariate observation data based on the DAG to generate the output data.

16. The method of claim 14, wherein the multivariate observation data is based on input streaming or non-streaming data received from the one or more network devices.

17. A system for learning a causal structure from multivariate input data comprising:
a memory having computer-readable instructions stored thereon; and
a processing circuit that executes the computer-readable instructions to:
  receive multivariate observation data from a plurality of data sources, the multivariate observation data comprising variable values associated with a plurality of variables;
  initialize, by the processing circuit executing a graph-learning module stored in memory, a structural dependency model comprising a directed acyclic graph (DAG) template that defines potential causal relationships among the plurality of variables;
  transform, by the processing circuit, the multivariate observation data into a structured dependency representation configured for causal structure analysis, wherein the structured dependency representation captures relationships among the plurality of variables for use in learning causal connections;
  execute, by the processing circuit executing the graph-learning module, an iterative structure-learning operation to determine a topological order of the DAG based on the structured dependency representation, wherein each iteration dynamically updates:
    (i) an index identifying a candidate variable for edge evaluation,
    (ii) a model evaluation score representing a causal consistency metric, and (iii) an ordered list of variables stored in the memory, and wherein the updates are applied through memory-level transformations of the structured dependency representation without exposing intermediate computation results externally;

detect convergence of the topological order when the model evaluation score satisfies a predefined accuracy criterion; and store the learned topological order in memory for implementation in subsequent causal inference operations that utilize the learned causal relationships of the DAG to perform predictive, discovery, estimation, or diagnostic computations.

18. The system of claim 17, wherein:

the plurality of data sources comprises two or more network devices, and the topological order of the DAG is used to analyze the multivariate observation data and transform the multivariate observation data to output data.

19. The system of claim 18, wherein the processing circuit further executes the computer-readable instructions to:

determine a correct set of edges for the DAG;

generate the DAG based on the topological order of the DAG and the correct set of edges; and analyze the multivariate observation data based on the DAG to generate the output data.

20. The system of claim 18, wherein the multivariate observation data is based on input streaming or non-streaming data received from the one or more network devices.

\* \* \* \* \*